US007394823B2

(12) United States Patent
Sano

(10) Patent No.: US 7,394,823 B2
(45) Date of Patent: Jul. 1, 2008

(54) SYSTEM HAVING CONFIGURABLE INTERFACES FOR FLEXIBLE SYSTEM CONFIGURATIONS

(75) Inventor: Barton J. Sano, Fremont, CA (US)

(73) Assignee: Broadcom Corporation, Irvine, CA (US)

(*) Notice: Subject to any disclaimer, the term of this patent is extended or adjusted under 35 U.S.C. 154(b) by 1051 days.

(21) Appl. No.: 10/270,014

(22) Filed: Oct. 11, 2002

(65) Prior Publication Data

US 2003/0097467 A1 May 22, 2003

Related U.S. Application Data

(60) Provisional application No. 60/380,740, filed on May 15, 2002, provisional application No. 60/348,777, filed on Jan. 14, 2002, provisional application No. 60/348,717, filed on Jan. 14, 2002, provisional application No. 60/344,713, filed on Dec. 24, 2001, provisional application No. 60/331,789, filed on Nov. 20, 2001.

(51) Int. Cl.
    *H04L 12/56* (2006.01)
(52) U.S. Cl. .................. 370/419; 370/235; 711/141
(58) Field of Classification Search .................. 370/235, 370/419; 711/141
    See application file for complete search history.

(56) References Cited

U.S. PATENT DOCUMENTS

| 4,788,679 | A | | 11/1988 | Kataoka et al. | |
|---|---|---|---|---|---|
| 5,623,628 | A | * | 4/1997 | Brayton et al. | 711/141 |
| 5,644,753 | A | | 7/1997 | Ebrahim et al. | |
| 5,689,500 | A | * | 11/1997 | Chiussi et al. | 370/235 |
| 5,710,907 | A | | 1/1998 | Hagersten et al. | |
| 5,805,590 | A | | 9/1998 | Gillard et al. | |
| 5,878,268 | A | | 3/1999 | Hagersten | |
| 5,887,138 | A | | 3/1999 | Hagersten et al. | |

(Continued)

FOREIGN PATENT DOCUMENTS

DE          199 07 200           2/1999

(Continued)

OTHER PUBLICATIONS

Giorgi et al.; PSCR: A Coherence Protocol for Eliminating Passive Sharing in Shared-Bus Shared-Memory Multiprocessors; IEEE Transactions on Parallel and Distributed Systems; vol. 10, No. 7, Jul. 1999.

(Continued)

*Primary Examiner*—Chi Pham
*Assistant Examiner*—Albert T. Chou
(74) *Attorney, Agent, or Firm*—Garlick Harrison & Markison

(57) ABSTRACT

An apparatus includes a plurality of memories, a plurality of systems, and a switch interface circuit. Each of the plurality of systems includes a memory controller coupled to a respective one of the plurality of memories. Additionally, each of the plurality of systems is coupled to at least one other one of the plurality of systems. Each of the plurality of systems further includes one or more coherent agents configured to access the plurality of memories, and wherein the plurality of systems enforce coherency across the plurality of systems for at least some accesses. At least one of the plurality of systems is coupled to the switch interface circuit separate from the interconnection of the plurality of systems. The switch interface circuit is configured to interface the apparatus to a switch fabric.

19 Claims, 19 Drawing Sheets

U.S. PATENT DOCUMENTS

| | | | |
|---|---|---|---|
| 5,920,226 | A | 7/1999 | Mimura |
| 5,925,097 | A | 7/1999 | Gopinath et al. |
| 5,961,623 | A | 10/1999 | James et al. |
| 5,963,745 | A | 10/1999 | Collins et al. |
| 6,009,426 | A | 12/1999 | Jouenne et al. |
| 6,070,215 | A | 5/2000 | Deschepper et al. |
| 6,094,715 | A | 7/2000 | Wilkinson et al. |
| 6,101,420 | A | 8/2000 | Van Doren et al. |
| 6,105,119 | A | 8/2000 | Kerr et al. |
| 6,108,739 | A | 8/2000 | James et al. |
| 6,108,752 | A | 8/2000 | Van Doren et al. |
| 6,128,728 | A | 10/2000 | Dowling |
| 6,138,217 | A | 10/2000 | Hamaguchi |
| 6,182,201 | B1 | 1/2001 | Arimilli et al. |
| 6,185,520 | B1 | 2/2001 | Brown et al. |
| 6,195,739 | B1 | 2/2001 | Wright et al. |
| 6,202,132 | B1 | 3/2001 | Islam et al. |
| 6,209,065 | B1 | 3/2001 | Van Doren et al. |
| 6,219,755 | B1 | 4/2001 | Klein |
| 6,249,846 | B1 | 6/2001 | Van Doren et al. |
| 6,266,731 | B1 | 7/2001 | Riley et al. |
| 6,298,370 | B1 | 10/2001 | Tang et al. |
| 6,338,122 | B1 | 1/2002 | Baumgartner et al. |
| 6,901,052 | B2 * | 5/2005 | Buskirk et al. .............. 370/235 |
| 2001/0039604 | A1 | 11/2001 | Takahashi |
| 2002/0038407 | A1 | 3/2002 | Mounes-Toussi et al. |
| 2004/0062261 | A1 * | 4/2004 | Zecharia et al. .............. 370/419 |

FOREIGN PATENT DOCUMENTS

| | | |
|---|---|---|
| EP | 265 636 | 10/1986 |
| EP | 893 766 | 1/1999 |
| EP | 920 157 | 6/1999 |
| EP | 936 555 | 8/1999 |
| EP | 945 805 | 9/1999 |
| EP | 777 179 | 5/2002 |
| WO | 98/15155 | 4/1998 |
| WO | WO 00/38069 | 6/2000 |

OTHER PUBLICATIONS

"They Design and Analysis of Dash: A Scalable Directory-Based Multiprocessor," Daniel Lenoski, Dec. 1991, A Dissertation submitted to the Dept. of Elect. Engin. And the committee on graduate studies of Stanford Univ., 176 pages.

"An Argument for Simple COMA," Saulsbury, et al., Aug. 1, 1994, SISC Research Report No. R94:15, 20 pages.

Tom R. Halfhill, "SiByte Reveals 64-Bit Core For NPUs; Independent MIPS64 Design Combines Low Power, High Performance," Microdesign Resources, Jun. 2000, Microprocessor Report, 4 pages.

SiByte, "Target Applications," http://sibyte.com/mercurian/applications.htm, Jan. 15, 2001, 2 pages.

SiByte, "SiByte Technology," http://sibyte.com/mercurian/technology.htm, Jan. 15, 2001, 3 pages.

SiByte, "The Mercurian Processor," http://sibyte.com/mercurian, Jan. 15, 2001, 2 pages.

SiByte, "Fact Sheet," SB-1 CPU, Oct. 2000, rev. 0.1, 1 page.

SiByte, "Fact Sheet," SB-1250, Oct. 2000, rev. 0.2, 10 pages.

Stepanian, SiByte, SiByte SB-1 MIPS64 CPU Core, Enbedded Processor Forum 2000, Jun. 13, 2000, 15 pages.

Jim Keller, "The Mercurian Processor: A High Performance, Power-Efficient CMP for Networking," Oct. 10, 2000, 22 pages.

Intel, "21143 PCI/CardBus 10/100Mb/s Ethernet LAN Controller," Hardware Reference Manual, Revision 1.0, Oct. 1998, 219 pages.

European Search Report for EP26011, mailed Mar. 6, 2003, 5 pages.

EP Search Report for EP app 02025691.3, May 9, 2003, Broadcom Corp.

* cited by examiner

| 63 | 62 | 61 | 60 | 59 58 57 | 56 55 | 54 48 | 47 32 | 31 0 |
|---|---|---|---|---|---|---|---|---|
| HW | SOP | EOP | INT | SWID | LE | SE | PE | RSVD | Buffer Length | RSVD |

| 63 52 | 51 48 | 47 40 | 39 0 |
|---|---|---|---|
| RSVD | Next_Dest | VC | Memory Buffer Address |

Interconnect Transactions

| Transaction |
|---|
| RdShd |
| RdExc |
| Wr |
| WrInv |
| RdKill |
| RdInv |
| WrFlush |
| Nop |

— 142

HTcc Commands

| Command | Virtual Channel |
|---|---|
| cRdShd | CRd |
| cRdExc | CRd |
| Flush | Probe |
| Kill | Probe |
| Kill_Ack | Ack |
| WB | Ack |
| Fill | CFill |

| Source | Transaction | RLD State | New RLD State | Set Owner? | Reset Other Owners? |
|---|---|---|---|---|---|
| Local | RdExc | S | I | -- | -- |
| Local | RdExc | M | I | -- | -- |
| Local | RdShd | M | I | -- | -- |
| Remote | RdExc | S | M | yes | yes |
| Remote | RdExc | M | M | yes | yes |
| Remote | RdExc | I | M | yes | n/a |
| Remote | RdShd | S | S | yes | no |
| Remote | RdShd | M | S | yes | yes |
| Remote | RdShd | I | S | yes | n/a |
| Either | WrInv | S or M | I | -- | -- |

Fig. 18

SYSTEM HAVING CONFIGURABLE INTERFACES FOR FLEXIBLE SYSTEM CONFIGURATIONS

This application claims benefit of priority to U.S. Provisional Patent Application Ser. No. 60/380,740, filed May 15, 2002. This application claims benefit of priority to U.S. Provisional Patent Application Ser. No. 60/331,789, filed Nov. 20, 2001. This application claims benefit of priority to U.S. Provisional Patent Application Ser. No. 60/344,713, filed Dec. 24, 2001. This application claims benefit of priority to U.S. Provisional Patent Application Ser. No. 60/348,777, filed Jan. 14, 2002. This application claims benefit of priority to U.S. Provisional Patent Application Ser. No. 60/348,717, filed Jan. 14, 2002.

BACKGROUND OF THE INVENTION

1. Field of the Invention

This invention is related to the fields of packet processing and coherency.

2. Description of the Related Art

With the continued expansion of networks, networked systems (e.g. local area networks (LANs), wide area networks (WANs), the Internet, etc.), and emerging storage subsystem technologies such as network attached storage (NAS) and storage area network (SAN), packet processing is an increasingly important function for a variety of systems. The amount of packet processing to be performed may be increasing due to the increased amount of packet traffic, as well as the more sophisticated packet processing that is being attempted on each packet (e.g. processing at deeper layers of the packet).

In the past, packet processing circuitry was often implemented via fixed-function (non-programmable) devices. As packet interfaces, packet content, and packet standards evolved, the fixed-function devices would be redesigned to handle the changes. More recently, network processing units (NPUs) have been implemented to provide programmable packet processing solutions. However, NPUs have generally not provided robust scalability to multiple NPUs, and thus NPUs may have to be replaced when the processing power of the NPUs is no longer sufficient to handle the desired packet processing.

SUMMARY OF THE INVENTION

In one embodiment, an apparatus includes a plurality of memories, a plurality of systems, and a switch interface circuit. Each of the plurality of systems includes a memory controller coupled to a respective one of the plurality of memories. Additionally, each of the plurality of systems is coupled to at least one other one of the plurality of systems. Each of the plurality of systems further includes one or more coherent agents configured to access the plurality of memories, and wherein the plurality of systems enforce coherency across the plurality of systems for at least some accesses. At least one of the plurality of systems is coupled to the switch interface circuit separate from the interconnection of the plurality of systems. The switch interface circuit is configured to interface the apparatus to a switch fabric.

In another embodiment, a network device includes a switch fabric and one or more line cards coupled to the switch fabric. Each line card includes a plurality of memories and a plurality of systems as described above. In one implementation, the network device may further include one or more network cards comprising a plurality of memories and a plurality of systems as described above.

BRIEF DESCRIPTION OF THE DRAWINGS

The following detailed description makes reference to the accompanying drawings, which are now briefly described.

FIG. 12 is a block diagram of one embodiment of a descriptor shown in FIG. 11.

FIG. 13 is a table of exemplary transaction and exemplary coherency commands.

FIG. 18 is a table illustrating exemplary updates of one embodiment of a remote line directory.

Figure 1:
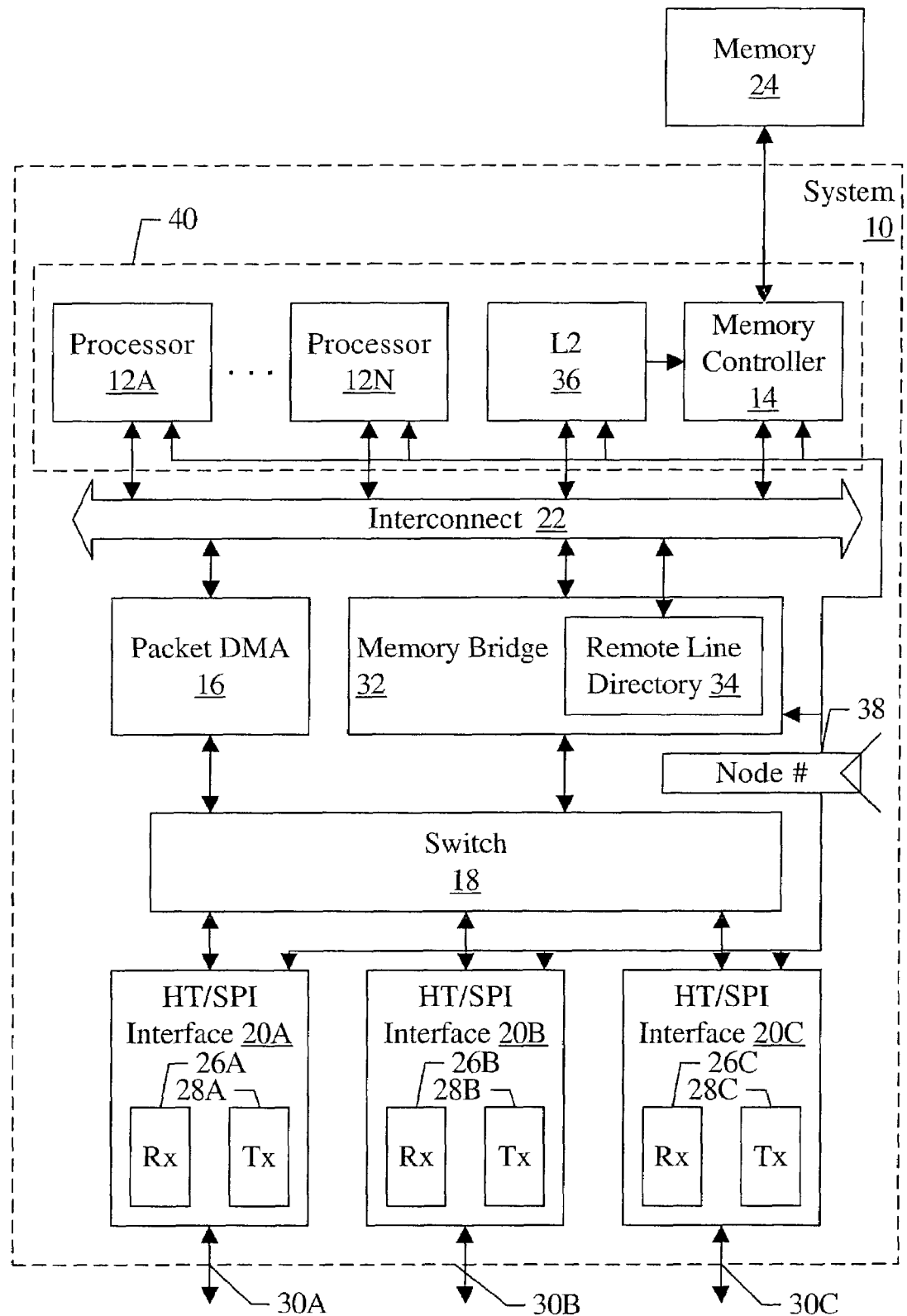
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

System Overview

Turning now to FIG. 1, a block diagram of one embodiment of a system 10 is shown. In the embodiment of FIG. 1, the system 10 includes one or more processors 12A-12N, a memory controller 14, a switch 18, a set of interface circuits 20A-20C, a memory bridge 32, a packet DMA circuit 16, and an L2 cache 36. The memory bridge 32 includes a remote line directory 34. The system 10 includes an interconnect 22 to which the processors 12A-12N, the memory controller 14, the L2 cache 36, the memory bridge 32, the packet direct memory access (DMA) circuit 16, and the remote line directory 34 are coupled. The system 10 is coupled, through the memory controller 14, to a memory 24. The interface circuits 20A-20C each include a receive (Rx) circuit 26A-26C and a transmit (Tx) circuit 28A-28C. The system 10 is coupled to a set of interfaces 30A-30C through respective interface circuits 20A-20C. The interface circuits 20A-20C are coupled to the switch 18, which is further coupled to the memory bridge 32 and the packet DMA circuit 16. A configuration register 38 is also illustrated in FIG. 1, which stores a node number (Node #) for the system 10. The configuration register 38 is coupled to the L2 cache 36, the memory controller 14, the memory bridge 32, and the interface circuits 20A-20C in the embodiment of FIG. 1. The processors 12A-12N may also be coupled to receive the node number from the configuration register 38.

The system 10 may be configurable as a node in a multinode coherent system. In such a coherent system, internode coherency may be maintained via coherency commands transmitted to the system 10 and by the system 10 on one or more of the interfaces 30A-30C (via the interface circuits 20A-20C, respectively). Additionally, packets may be transmitted/received on one or more interfaces 30A-30C (via the interface circuits 20A-20C). Furthermore, noncoherent commands (e.g. communications with input/output (I/O) circuits) may be transmitted/received on one or more interfaces 30A-30C. Thus, a mix of packet, noncoherent, and coherent traffic may be received on the interfaces 30A-30C. Particularly, at least one of the interfaces 30A-30C may carry a mix of packet, noncoherent, and coherent traffic.

As used herein, a memory bridge includes circuitry designed to handle internode coherency functions within a node. Thus, the memory bridge 32 may be a source/destination of the coherency commands. In response to at least some received coherency commands, the memory bridge 32 may generate corresponding transactions on the interconnect 22. In response to at least some transactions on the interconnect 22 generated by other agents, the memory bridge 32 may generate coherency commands. The memory bridge 32 may also handle transmission and processing of noncoherent commands, in one embodiment.

As used herein, a packet DMA circuit comprises circuitry to communicate packets to and from a memory. The packet DMA circuit 16 may generate write transactions on the interconnect 22 to the memory controller 14 to write received packets to the memory 24, and may generate read transactions on the interconnect 22 to read packets from the memory 24 for transmission by one of the interface circuits 20A-20C.

The switch 18 may separate coherent traffic and packet traffic from the interface circuits 20A-20C, routing the coherent traffic to the memory bridge 32 and routing the packet traffic to the packet DMA circuit 16. In one embodiment, the switch 18 may generally select sources and destinations to be coupled for communication based on requests from the sources to transmit data and requests from the destinations for data. For example, the interface circuits 20A-20C (particularly the Rx circuits 26A-26C) may identify coherency commands and packets received on the interfaces 30A-30C, and may request transfer to the packet DMA circuit 16 (for packets) and the memory bridge 32 (for coherency commands). If the packet DMA circuit 16 or memory bridge 32 has indicated the ability to receive data of the corresponding type, the switch 18 may grant a transfer between a requesting Rx circuit 26A-26C and the packet DMA circuit 16 or the memory bridge 32. Similarly, the packet DMA circuit 16 or memory bridge 32 may request a transfer to an interface circuit 20A-20C (particularly, to a Tx circuit 28A-28C). If the Tx circuit 28A-28C has indicated the ability to receive data of the corresponding type, the switch 18 may grant a transfer between the requesting packet DMA circuit 16/memory bridge 32 and the Tx circuit 28A-28C.

In one embodiment, the interfaces 30A-30C may support a set of virtual channels in which coherency commands, noncoherent commands, and packets are transmitted. Each virtual channel is defined to flow independent of the other virtual channels, even though the virtual channels may share certain physical resources (e.g. the interface 30A-30C on which the commands are flowing). These virtual channels may be mapped to internal virtual channels (referred to as switch virtual channels herein). The switch 18 may be virtual-channel aware. That is, the switch 18 may grant a coupling between a source and a destination based not only on the ability of the source to transfer data and the destination to receive data, but also on the ability of the source to transfer data in a particular switch virtual channel and the destination to receive data on that switch virtual channel. Thus, requests from sources may indicate the destination and the virtual channel on which data is to be transferred, and requests from destinations may indicate the virtual channel on which data may be received. The switch virtual channels may identify a destination and a virtual channel at that destination, and they may be referred to as the destination and virtual channel, or collectively as the switch virtual channel, herein.

Additionally, in some embodiments, the switch 18 may merge inputs to a given destination virtual channel on a packet boundary. That is, if two sources are requesting to transfer packet data to the same destination and virtual channel, and one of the sources has been granted to that destination and virtual channel, the switch inhibits granting to the other source for that destination and virtual channel until the current source reaches a packet boundary. A similar boundary condition may be used for coherency commands, if more than one transfer through the switch 18 is used to transfer coherency commands.

Each of the interfaces 30A-30C used for coherent communications are defined to be capable of transmitting and receiving coherency commands. Particularly, in the embodiment of FIG. 1, those interfaces 30A-30C may be defined to receive/transmit coherency commands to and from the system 10 from other nodes. Additionally, other types of commands may be carried. In one embodiment, each interface 30A-30C that is used to carry coherency commands may be a HyperTransport™ (HT) interface, including an extension to the HT interface to include coherency commands (HTcc). Additionally, in some embodiments, an extension to the HyperTransport interface to carry packet data (Packet over HyperTransport, or PoHT) may be supported. As used herein, coherency commands include any communications between nodes that are used to maintain coherency between nodes. The commands may include read or write requests initiated by a node to fetch or update a cache block belonging to another node, probes to invalidate cached copies of cache blocks in remote nodes (and possibly to return a modified copy of the cache block to the home node), responses to probe commands, fills which transfer data, etc. A noncoherent command is a communication between devices that does not necessarily occur coherently. For example, standard HT commands may be noncoherent commands.

A given HT interface may thus carry a mix of coherent, noncoherent and packet traffic. Traffic on a given HT interface received by one of the interface circuits 20A-20C may be routed: (i) to the packet DMA circuit 16 (for a PoHT command); (ii) the memory bridge 32 (for a coherent command or non-coherent command to be processed in the system 10); or (iii) another interface circuit 20A-20C (for any type of command not targeted at the system 10). The virtual channels on the HT interfaces may include the standard HT virtual channels as well as some additional virtual channels defined for the HTcc and/or PoHT extensions. The HTcc virtual channels are shown in FIG. 13, and the PoHT extensions may include a number of packet virtual channels (e.g. 16 virtual channels, in one embodiment).

In some embodiments, one or more of the interface circuits 20A-20C may not be used for coherency management and may be defined as packet interfaces. The corresponding interfaces 30A-30C may be HT interfaces using the PoHT extension. Alternative, such interfaces 30A-30C may be system packet interfaces (SPI) according to any level of the SPI specification set forth by the Optical Internetworking Forum (e.g. level 3, level 4, or level 5). In one particular embodiment, the interfaces may be SPI-4 phase 2 interfaces. In the illustrated embodiment, each interface circuit 20A-20C may be configurable to communicate on either the SPI-4 interface or the HT interface. Each interface circuit 20A-20C may be individually programmable, permitting various combinations of the HT and SPI-4 interfaces as interfaces 30A-30C. The programming may be performed in any fashion (e.g. sampling certain signals during reset, shifting values into configuration registers (not shown) during reset, programming the interfaces with configuration space commands after reset, pins that are tied up or down externally to indicate the desired programming, etc.). Other embodiments may employ any interface capable of carrying packet data (e.g. the Media Independent Interface (MII) or the Gigabit MII (GMII) interfaces, X.25, Frame Relay, Asynchronous Transfer Mode (ATM), etc.). The packet interfaces may carry packet data directly (e.g. transmitting the packet data with various control information indicating the start of packet, end of packet, etc.) or indirectly (e.g. transmitting the packet data as a payload of a command, such as PoHT). The SPI-4 interface may define 16 hardware virtual channels, extendable to 256 virtual channels in software.

An overview of one embodiment of the internode coherency mechanism is next provided. Additional details regarding the internode coherency mechanism (for one embodiment) are provided further below (e.g. with regard to FIGS. 13-18).

The system 10 may support intranode coherency for transactions on the interconnect 22. Additionally, the system 10 may support internode coherency with other nodes (e.g. a CC-NUMA coherency, in one embodiment). For example, in one embodiment, if a transaction on the interconnect 22 (e.g. a transaction issued by the processors 12A-12N) accesses a cache block that is remote to the system 10 (i.e. the cache block is part of the memory coupled to a different node) and the system 10 does not have sufficient ownership to perform the transaction, the memory bridge 32 may issue one or more coherency commands to the other nodes to obtain the ownership (and a copy of the cache block, in some cases). Similarly, if the transaction accesses a local cache block but one or more other nodes have a copy of the cache block, the memory bridge 32 may issue coherency commands to the other nodes. Still further, the memory bridge 32 may receive coherency commands from other nodes, and may perform transactions on the interconnect 22 to effect the coherency commands.

In one embodiment, a node such as system 10 may have memory coupled thereto (e.g. memory 24). The node may be responsible for tracking the state, in other nodes, of each cache block from the memory in that node. A node is referred to as the "home node" for cache blocks from the memory assigned to that node. A node is referred to as a "remote node" for a cache block if the node is not the home node for that cache block. Similarly, a cache block is referred to as a local cache block in the home node for that cache block and as a remote cache block in other nodes.

Generally, a remote node may begin the coherency process by requesting a copy of a cache block from the home node of that cache block using a coherency command. The memory bridge 32 in the remote node, for example, may detect a transaction on the interconnect 22 that accesses the cache block and may detect that the remote node does not have sufficient ownership of the cache block to complete the transaction (e.g. it may not have a copy of the cache block at all, or may have a shared copy and may require exclusive ownership to complete the transaction). The memory bridge 32 in the remote node may generate and transmit the coherency command to the home node to obtain the copy or to obtain sufficient ownership. The memory bridge 32 in the home node may determine if any state changes in other nodes are to be performed to grant the requested ownership to the remote node, and may transmit coherency commands (e.g. probe commands) to effect the state changes. The memory bridge 32 in each node receiving the probe commands may effect the state changes and respond to the probe commands. Once the responses have been received, the memory bridge 32 in the home node may respond to the remote node (e.g. with a fill command including the cache block).

The remote line directory 34 may be used in the home node to track the state of the local cache blocks in the remote nodes. The remote line directory 34 is updated each time a cache block is transmitted to a remote node, the remote node returns the cache block to the home node, or the cache block is invalidated via probes. As used herein, the "state" of a cache block in a given node refers to an indication of the ownership that the given node has for the cache block according to the coherency protocol implemented by the nodes. Certain levels of ownership may permit no access, read-only access, or read-write access to the cache block. For example, in one embodiment, the modified, shared, and invalid states are supported in the internode coherency protocol. In the modified state, the node may read and write the cache block and the node is responsible for returning the block to the home node if evicted from the node. In the shared state, the node may read the cache block but not write the cache block without transmitting a coherency command to the home node to obtain modified state for the cache block. In the invalid state, the node may not read or write the cache block (i.e. the node does not have a valid copy of the cache block). Other embodiments may use other coherency protocols (e.g. the MESI protocol, which includes the modified, shared, and invalid states and an exclusive state in which the cache block has not yet been updated but the node is permitted to read and write the cache block, or the MOESI protocol which includes the modified, exclusive, shared, and invalid states and an owned state which indicates that there may be shared copies of the block but the copy in main memory is stale). In one embodiment, agents within the node may implement the MESI protocol for intranode coherency. Thus, the node may be viewed as having a state in the internode coherency and individual agents may have a state in the intranode coherency (consistent with the internode coherency state for the node containing the agent).

Generally speaking, a node may include one or more coherent agents (dotted enclosure 40 in FIG. 1). In the embodiment of FIG. 1, the processors 12A-12N, the L2 cache 36, and the memory controller 14 may be examples of coherent agents 40. Also, the memory bridge 32 may be a coherent agent (as a proxy for other nodes, based on the state in the remote line directory 34). However, other embodiments may include other coherent agents as well, such as a bridge to one or more I/O interface circuits, or the I/O interface circuits themselves. Generally, an agent includes any circuit which participates in transactions on an interconnect. A coherent agent is an agent that is capable of performing coherent transactions and/or operating in a coherent fashion with regard to transactions. A transaction is a communication on an interconnect. The transaction is sourced by one agent on the interconnect, and may have one or more agents as a target of the transaction. Read transactions specify a transfer of data from a target to the source, while write transactions specify a transfer of data from the source to the target. Other transactions may be used to communicate between agents without transfer of data, in some embodiments.

In one embodiment, the remote line directory 34 may be configured to track a subset of the local memory space that may be coherently shared with other nodes. That is, the remote line directory 34 may be configured to track up to a maximum number of cache blocks, where the maximum number is less than the total number of cache blocks that may be coherently shared. In another embodiment, the maximum number may be less than the total number of remote cache entries. The remote line directory may have any structure (e.g. cache-like structures such as direct-mapped, fully associative, set associative, etc.). In one embodiment, the remote line directory 34 may be 16 k entries arranged in an 8 way set associative structure. If a cache block is being accessed by a remote node, and the remote line directory 34 in the home node detects a miss for the cache block, an entry is allocated to track the cache block. If the allocated entry is currently allocated to track a second cache block, the memory bridge 32 in the home node may generate probes to evict the second cache block from the other nodes (and possibly write back modified data to the home node, if applicable).

In one implementation, the L2 cache 36 in a remote node is designated to retain the node state for modified remote cache blocks. If the L2 cache 36 evicts a modified remote cache block, the L2 cache 36 may cause the remote block to be evicted from the node as a whole (e.g. using a WrFlush command described below).

It is noted that, in some embodiments, a coherency command may be received by an interface circuit 20A-20C that is passing through the system 10 to another node, and does not require processing in the system 10. The interface circuits 20A-20C may be configured to detect such commands and retransmit them (through another interface circuit 20A-20C via the switch 18) without involving the memory bridge 32.

An overview of the packet processing mechanism of one embodiment of the system 10 is next provided. Additional details of one embodiment may be provided below with respect to FIGS. 7-12.

The system 10 may provide a flexible structure for processing packets and for routing packets without processing by the processors 12A-12N. In one embodiment, the Rx circuits 26A-26C may be programmable to select destinations for packets based on one or more packet attributes. For example, packets may be transmitted on the interfaces 30A-30C in a virtual channel on that interface. The virtual channel may be a packet attribute used for selecting a destination. Additionally, the Rx circuits 26A-26C may be programmable to select one or more packet fields to use in determining a destination. For packets generated by software, the software may select a destination for the packet (e.g. by selecting an output queue in the packet DMA circuit 16 mapped to a given Tx circuit 28A-28C and to a virtual channel on the corresponding interface).

Two or more instantiations of the system 10 may be coupled together to form packet processing systems in which packets are routed among the systems as well as packet circuits. If the Rx circuit 26A-26C receives a packet and determines that the destination for the packet is a Tx circuit 28A-28C (to be transmitted to another system 10 or elsewhere), the Rx circuit 26A-26C may transmit the packet through the switch 18 to the Tx circuit 28A-28C. The packet may not be transmitted to memory, nor acted upon by the processors 12A-12N. Thus, memory bandwidth, storage, and processor time may be used to process packets which are not automatically routed from a source to a destination. In packet processing systems including multiple systems 10, a packet may be routed from an Rx circuit 26A-26C to a Tx circuit 28A-28C that is coupled to an interface to the other system 10, and the Rx circuit 28A-28C in the other system 10 that is coupled to that interface may determine that the destination of the packet is the packet DMA circuit 16 in the other system 10. Alternatively, a packet may be routed through one or more Rx and Tx circuits 26A-26C and 28A-28C from a packet source device to a packet destination device, without any processing by processors 12A-12N in the systems 10.

The Rx circuits 26A-26C may determine that received packets are to be stored to the memory 24 (by the packet DMA circuit 16) for processing within the system 10. In one embodiment, the packet DMA circuit 16 may comprise a set of input queues (the virtual channels in the packet DMA circuit 16) to which a packet may be mapped by the Rx circuits 26A-26C. The switch 18 may route the packets to the packet DMA circuit 16 for storage in the identified input queue. Similarly, software may generate packets and store them in packet DMA circuit output queues. The output queues may be mapped to a Tx circuit 28A-28C (and an output virtual channel in the Tx circuit 28A-28C), and the switch 18 may route packets from the packet DMA circuit 16 to the Tx circuit 28A-28C.

In one embodiment, the input queues and the output queues of the packet DMA circuit 16 may be logical queues. That is, the queues may actually be implemented in memory 24. The packet DMA circuit 16 may include buffers to buffer the packet data being transmitted to and from the memory 24. The queues may be implemented in any fashion. In one particular embodiment, each queue is implemented as a descriptor ring (or chain) which identifies memory buffers to store packet data corresponding to a given input queue. In other embodiments, the queues may be implemented in any desired fashion (e.g. linked lists, contiguous memory locations for memory buffers, etc.). The packet DMA circuit 16 may be configured to read/write descriptors from/to memory 24 as well.

Packets stored to memory by the packet DMA circuit 16 may be processed by software executed by the processors 12A-12N (or software executed on a processor in a remote node, using internode coherency to coherently access the packets). The software may determine that a given packet is terminated in the system 10. Alternatively, the processors 12A-12N may determine that the packet is to be retransmitted on one of the interfaces 30A-30C, and may prepare the packet for transmission by the packet DMA circuit 16. The packet may have been modified by software, or may be unmodified. Additionally, the software may generate packets to be transmitted. In any of these cases, the software may inform the packet DMA circuit 16 of the packet and its location in the memory 24, so that the packet DMA circuit 16 may read the packet from the memory 24 for transmission to the interface circuit 20A-20C coupled to the interface 30A-30C on which the packet is to be transmitted. In one embodiment, the software may inform the packet DMA circuit 16 of the packet by storing the packet in one or more memory buffers indicated by descriptors in the descriptor ring forming an output queue, and updating the descriptor to indicate that the packet DMA circuit 16 owns the descriptor.

As used herein, a "packet" may include any communication between a source and a destination which includes one or more headers defining the source and destination of the packet at various levels within the source and destination and which may include a data payload. "Packet data" may include any data that is part of a packet, or may refer to multiple packets.

As used herein, an interface circuit includes any circuitry configured to communicate on an interface according to the protocol defined for the interface. The interface circuit may include receive circuitry configured to receive communications on the interface and transmit the received communications to other circuitry internal to the system that includes the interface circuit. The interface circuit may also include transmit circuitry configured to receive communications from the other circuitry internal to the system and configured to transmit the communications on the interface.

The processors 12A-12N may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. The system 10 may include any number of processors (e.g. as few as one processor, two processors, four processors, etc.).

The L2 cache 36 may be any type and capacity of cache memory, employing any organization (e.g. set associative, direct mapped, fully associative, etc.). In one embodiment, the L2 cache 36 may be an 8 way, set associative, 1 MB cache. The L2 cache 36 is referred to as L2 herein because the processors 12A-12N may include internal (L1) caches. In other embodiments the L2 cache 36 may be an L1 cache, an L3 cache, or any other level as desired.

The memory controller 14 is configured to access the memory 24 in response to read and write transactions received on the interconnect 22. The memory controller 14 may receive a hit signal from the L2 cache, and if a hit is detected in the L2 cache for a given read/write transaction, the memory controller 14 may not respond to that transaction. The memory controller 14 may be designed to access any of a variety of types of memory. For example, the memory controller 14 may be designed for synchronous dynamic random access memory (SDRAM), and more particularly double data rate (DDR) SDRAM. Alternatively, the memory controller 16 may be designed for DRAM, DDR synchronous graphics RAM (SGRAM), DDR fast cycle RAM (FCRAM), DDR-II SDRAM, Rambus DRAM (RDRAM), SRAM, or any other suitable memory device or combinations of the above mentioned memory devices.

The interconnect 22 may be any form of communication medium between the devices coupled to the interconnect. For example, in various embodiments, the interconnect 22 may include shared buses, crossbar connections, point-to-point connections in a ring, star, or any other topology, meshes, cubes, etc. The interconnect 22 may also include storage, in some embodiments. In one particular embodiment, the interconnect 22 may comprise a bus. The bus may be a split transaction bus, in one embodiment (i.e. having separate address and data phases). The data phases of various transactions on the bus may proceed out of order with the address phases. The bus may also support coherency and thus may include a response phase to transmit coherency response information. The bus may employ a distributed arbitration scheme, in one embodiment. In one embodiment, the bus may be pipelined. The bus may employ any suitable signaling technique. For example, in one embodiment, differential signaling may be used for high speed signal transmission. Other embodiments may employ any other signaling technique (e.g. TTL, CMOS, GTL, HSTL, etc.). Other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, the bus may not be pipelined, if desired.

Various embodiments of the system 10 may include additional circuitry, not shown in FIG. 1. For example, the system 10 may include various I/O devices and/or interfaces. Exemplary I/O may include one or more PCI interfaces, one or more serial interfaces, Personal Computer Memory Card International Association (PCMCIA) interfaces, etc. Such interfaces may be directly coupled to the interconnect 22 or may be coupled through one or more I/O bridge circuits.

In one embodiment, the system 10 (and more particularly the processors 12A-12N, the memory controller 14, the L2 cache 36, the interface circuits 20A-20C, the memory bridge 32 including the remote line directory 34, the packet DMA circuit 16, the switch 18, the configuration register 38, and the interconnect 22) may be integrated onto a single integrated circuit as a system on a chip configuration. The additional circuitry mentioned above may also be integrated. Alternatively, other embodiments may implement one or more of the devices as separate integrated circuits. In another configuration, the memory 24 may be integrated as well. Alternatively, one or more of the components may be implemented as separate integrated circuits, or all components may be separate integrated circuits, as desired. Any level of integration may be used.

It is noted that, while three interface circuits 20A-20C are illustrated in FIG. 1, one or more interface circuits may be implemented in various embodiments. It is further noted that, while the cache block may be referred to as the granularity on which coherency is maintained, other embodiments may use different granularities greater than or less than a cache block in size. In such embodiments, a "coherency block" may be treated in the same fashion as a "cache block" or "block" when discussing coherency above. Generally, a "coherency block" may include a set of contiguous (in memory) bytes which are treated as a unit for coherency purposes. In various embodiments, a coherency block may comprise a portion of a cache block, a single cache block, or multiple cache blocks, as desired.

Use of the System in Network Devices and Storage Devices

One or more instantiations of system 10 may be used to form various network devices and/or storage devices. The processors 12A-12N included in the systems 10 may provide programmability for the network/storage devices, and thus the network devices/storage devices may be adapted to changes in the packet/storage protocols, standards, etc. as they are developed (e.g. by changing the software in the devices). In some implementations, the internode coherency features of the system 10 may be used to provide scalability to multiple systems 10. For example, coherency may be used to permit software access to any memory location (coupled to any system 10) in the same fashion that the local memory locations (coupled to the same system 10 as the initiator of the access). The coherency hardware may handle the transfer of the remote data to the initiator. In other implementations, the packet features of the system 10 (e.g. the routing of packets from an Rx circuit 26A-26C to a Tx circuit 28A-28C) may provide for scalability by passing a packet on to another system 10 without processing in the system 10 (thereby allowing packets to be distributed in the systems 10 without the intervention of the processors 12A-12N to cause the packet distribution). In still other implementations, a combination of the above mechanisms may be used to provide scalability.

Figure 2:
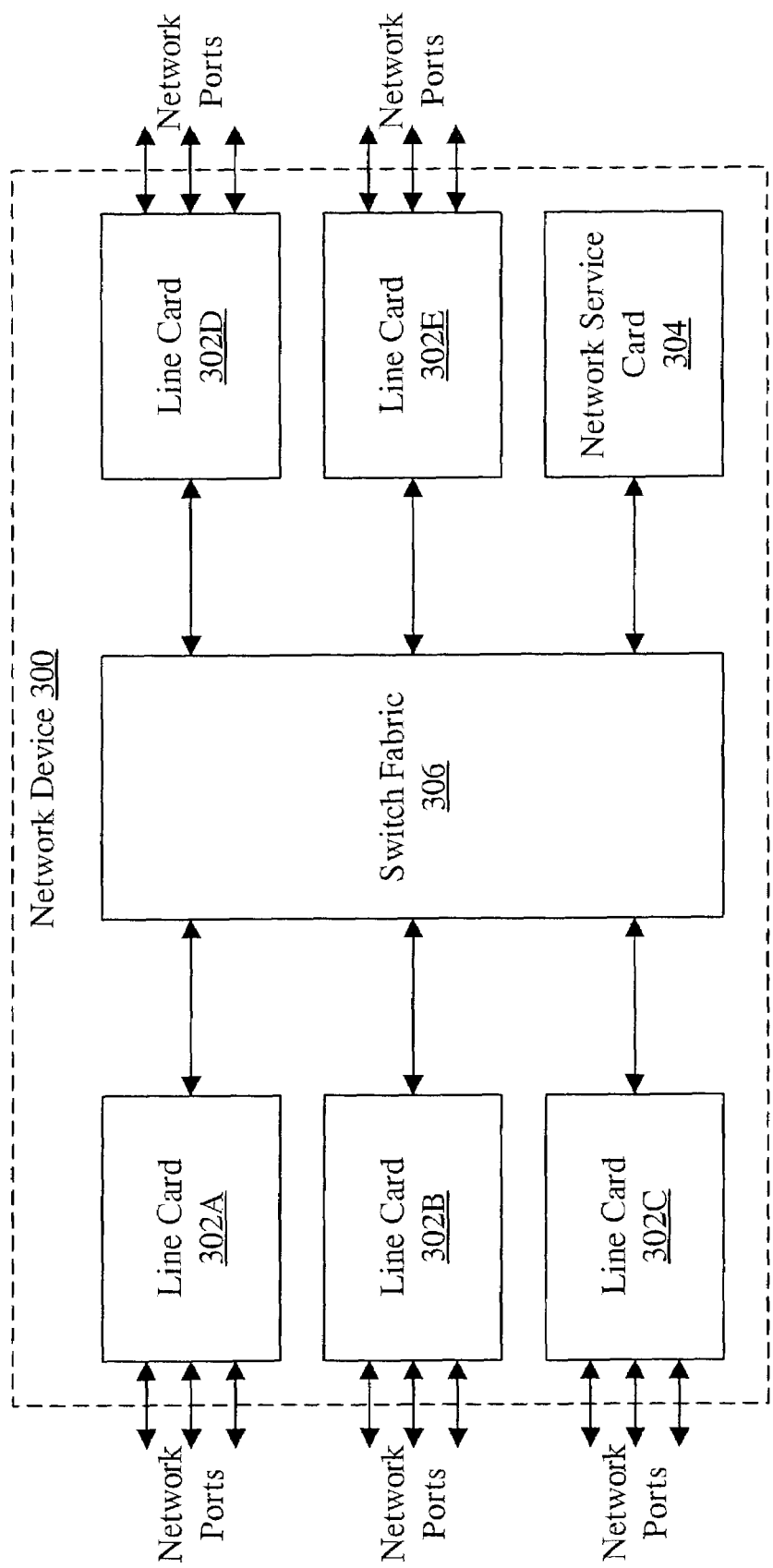
FIG. 2 is a block diagram of one embodiment of a network device.

Turning now to FIG. 2, a block diagram of one embodiment of a network device 300 is shown. In the embodiment of FIG. 2, the network device 300 includes a plurality of line cards 302A-302E, a network service card 304, and a switch fabric 306. Each of the line cards 302A-302E are coupled to a plurality of network ports and to the switch fabric 306. The network service card 304 is also coupled to the switch fabric 306.

Generally, the line cards 302A-302E are coupled to receive and transmit packets on the network ports. The line cards 302A-302E may process received packets to determine if the packets are, e.g., to be transmitted on another network port or responded to on the receiving network port. If a given packet is to be transmitted on a network port coupled to another line card, the line card 302A-302E may transmit the packet through the switch fabric 306 to that other line card. The line cards 302A-302E may be configured to perform a certain amount of packet processing to determine how to handle the packet. In some cases, deeper packet processing may be required to determine how to handle the packet. The network service card 304 may provide the deeper packet processing. If a line card 302A-302E determines that the network service card 304 is to be used to process a packet, the line card 302A-302E may transmit the packet to the network service card 304 through the switch fabric 306. The network service card 304 may process the packet and, if the packet is to be transmitted on a network port, the network service card 304 may transmit the packet through the switch fabric 306 to the line card 302A-302E that is coupled to that network port. Thus, the line cards 302A-302E may transmit packets on a network port that are received from another line card 302A-302E, from the network service card 304, or on another network port in the same line card 302A-302E.

Figure 3:
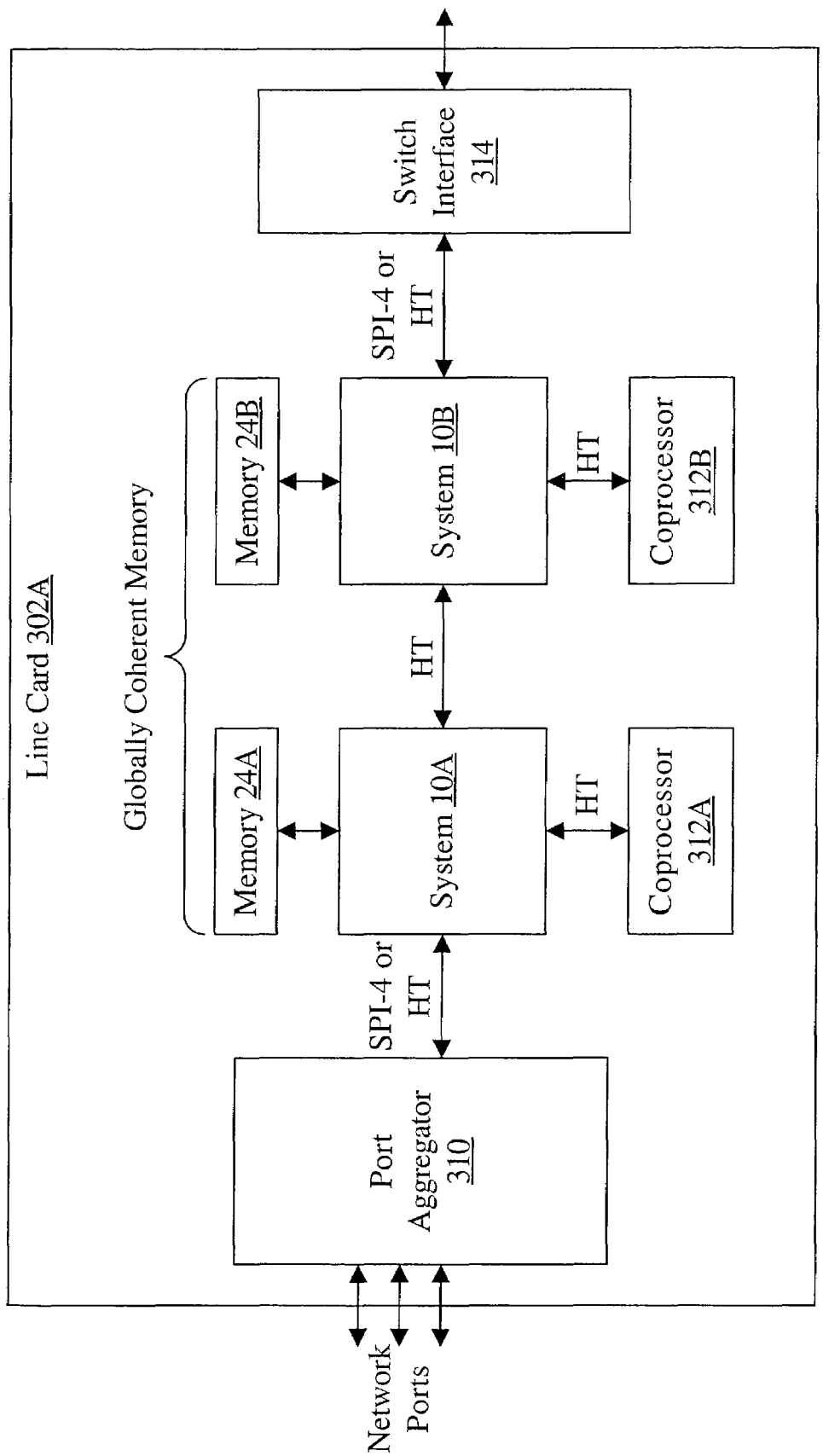
FIG. 3 is a block diagram of a first embodiment of a line card shown in FIG. 2.
Figure 4:
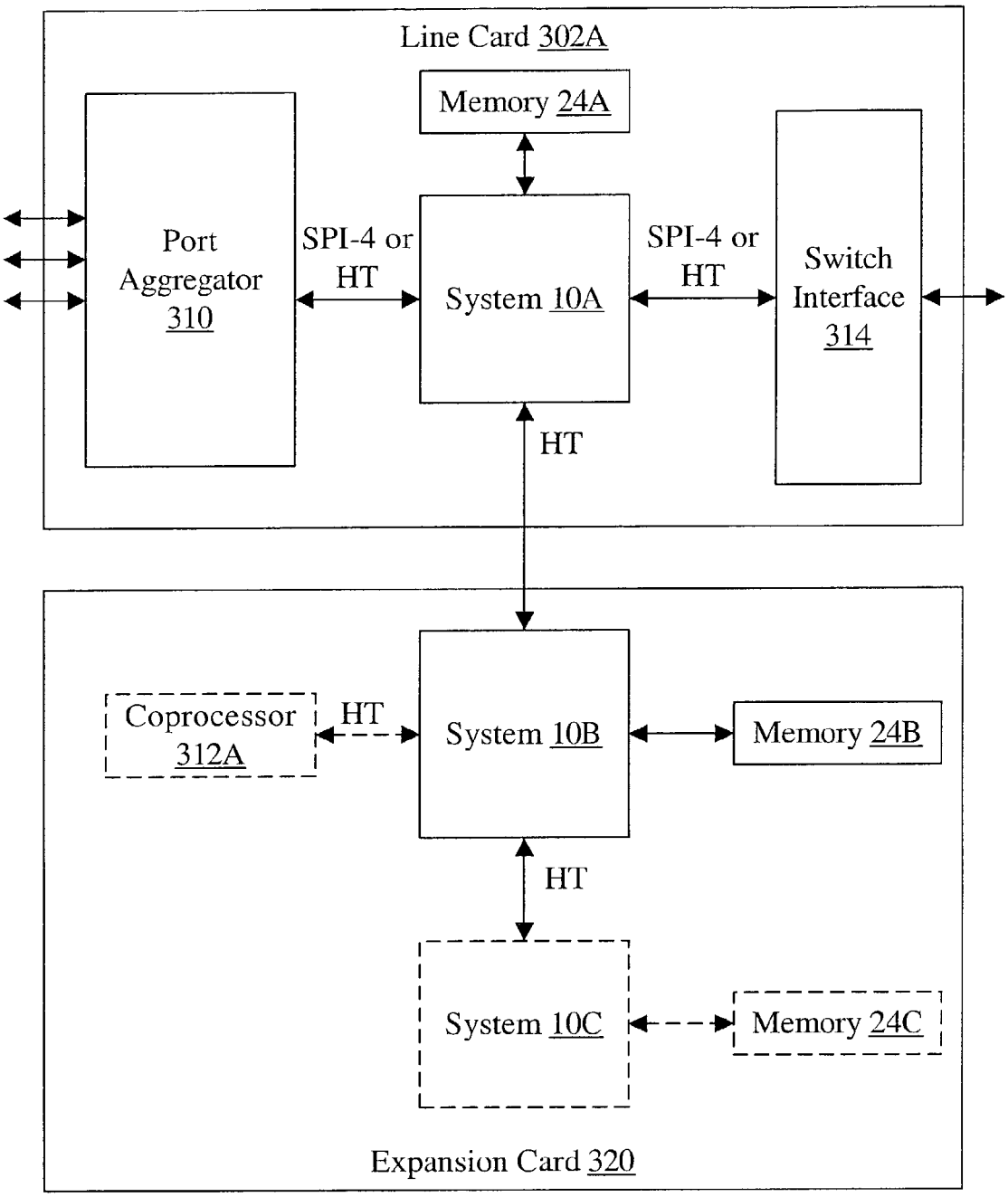
FIG. 4 is a block diagram of a third embodiment of a line card shown in FIG. 2.
Figure 5:
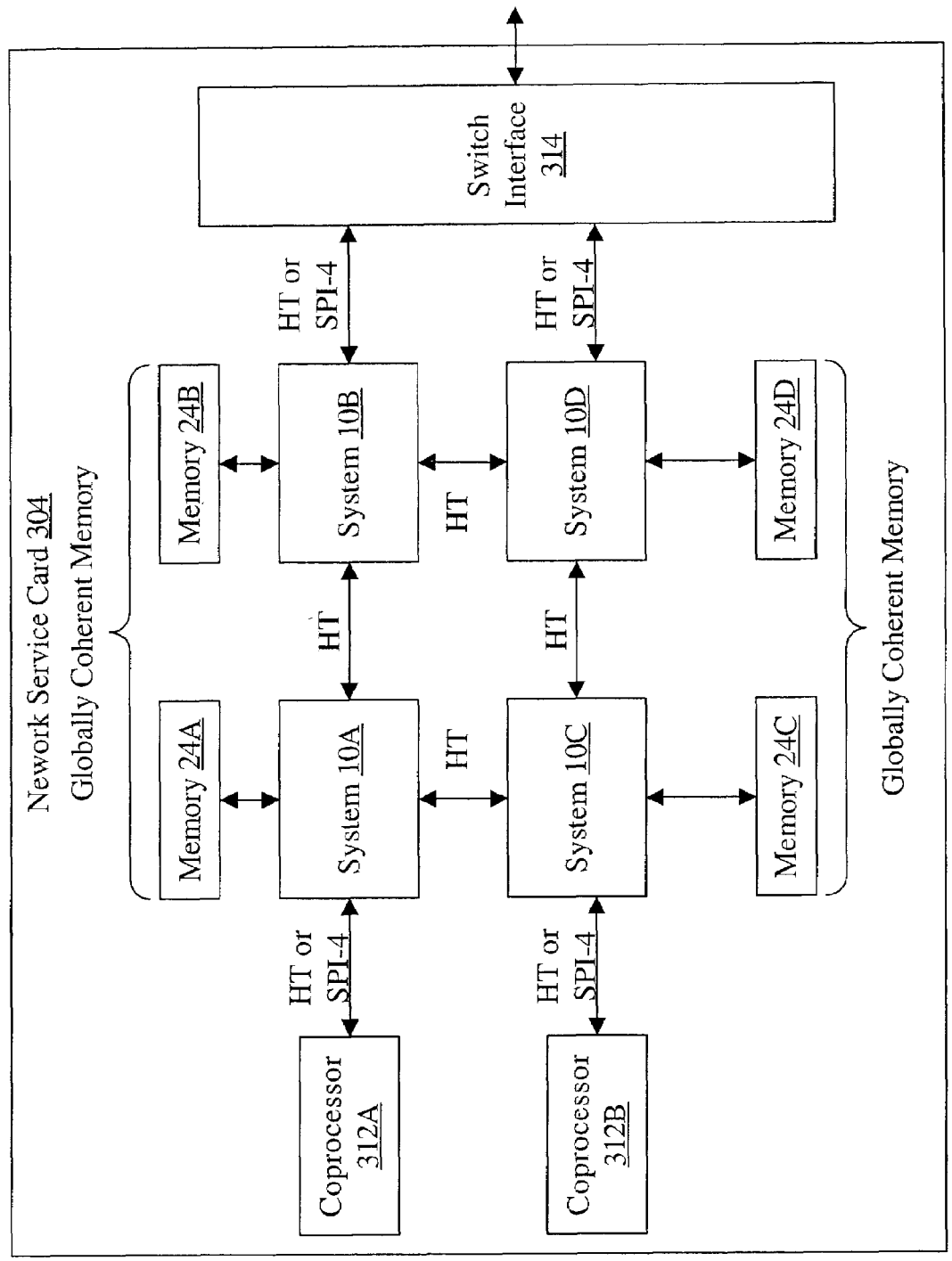
FIG. 5 is a block diagram of one embodiment of a network service card shown in FIG. 2.

One or more systems 10 may be implemented in any of the line cards 302A-302E or the network service card 304. As mentioned above, the systems 10 are programmable (via the processors 12A-12N) and thus software may be upgraded to track changes in various standards for packets, packet processing, etc. Additionally, combinations of the packet features and/or coherency features of the systems 10 may be used to scale the number of systems 10 in the card as desired, with minimal impacts to the software. Exemplary embodiments of the line cards 302A-302E and the network service card 304 are shown in FIGS. 3-5.

Generally, the switch fabric 306 may comprise any circuitry and interconnect that permits communication between the line cards 302A-302E and between the network service card 304 and the line cards 302A-302E. Any interface may be used (e.g. switch interfaces such as the universal test and operation physical interface for asynchronous transfer mode (UTOPIA), the common switch interface (CSIX), etc.; standard I/O interfaces such as peripheral component interconnect (PCI), universal serial bus (USB), etc.). For example, in one embodiment, one or more BCM 8832 chips (available from Broadcom Corporation of Irvine, Calif.) may be used.

Figure 6:
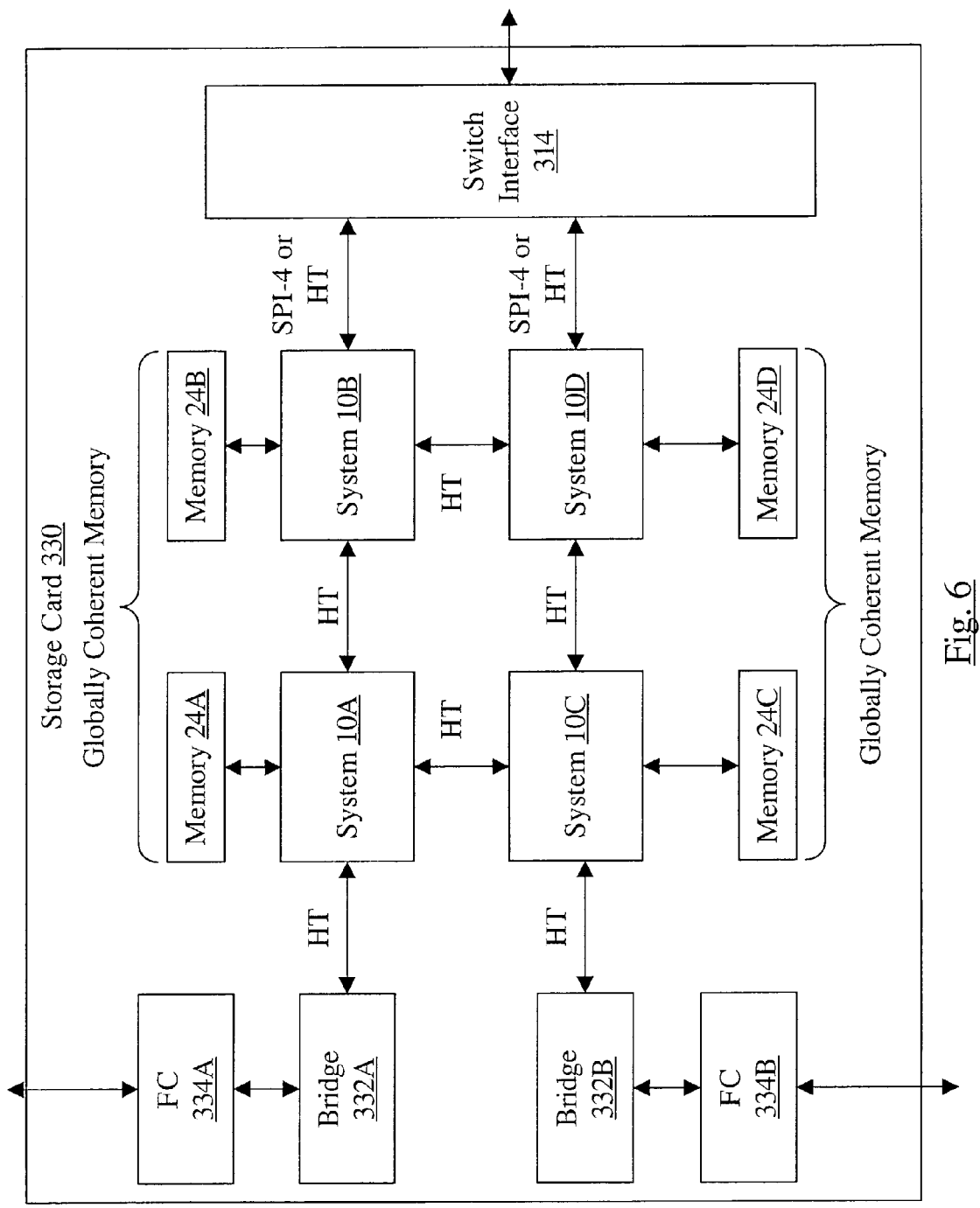
FIG. 6 is a block diagram of one embodiment of a storage card.

It is noted that, while one network service card 304 is shown in FIG. 2, other embodiments may include multiple network service cards, if desired. Additionally, embodiments of the network device 300 are contemplated in which one or more storage cards are included for interfacing to storage devices. Such a network device 300 may be used in network attached storage (NAS) implementations or other types of storage devices accessible via a network. An embodiment of a storage card implementing one or more systems 10 is shown in FIG. 6.

Line cards, storage cards, and network service cards may be examples of circuit cards. Generally, a circuit card may be any substrate to which various integrated circuits and other circuitry (e.g. discrete resistors, capacitors, etc.) may be attached and electrically interconnected via conductive lines attached to the circuit card or included within it. Printed circuit boards (PCBs) may be an example of a circuit card.

Turning now to FIG. 3, a block diagram of one embodiment of the line card 302A is shown. Other line cards 302B-302E may be similar. In the embodiment of FIG. 3, the line card 302A includes a port aggregator circuit 310, systems 10A-10B (instantiations of the system 10, each integrated on a separate integrated circuit, in some embodiments), memories 24A-24B (instantiations of the memory 24), coprocessors 312A-312B, and a switch interface circuit 314. The port aggregator circuit 310 is coupled to the network ports on the line card 302A and is further coupled to the system 10A. The system 10A is coupled to the memory 24A, the system 10B, and the coprocessor 312A. The system 10B is coupled to the memory 24B, the coprocessor 312B, and the switch interface circuit 314. The switch interface circuit 314 is coupled to the switch fabric 306 during use.

The systems 10A-10B may be coupled using an interface capable of carrying coherency commands (e.g. the HT interface, using the HTcc extensions, for one embodiment). Thus, the memories 24A-24B may be accessed in a globally coherent fashion. That is, each of the systems 10A-10B may include one or more coherent agents (e.g. the processors 12A-12N). Any coherent agent may access any memory location in the memories 24A-24B, and the access may be performed coherently across the systems 10A-10B (assuming the transaction is in the global coherent address space, for one embodiment described below).

The coherency features of the systems 10 may be used in a variety of fashions in the line card 302A. For example, packets received in the system 10A from the port aggregator circuit 310 may be passed to the packet DMA circuit 16 in the system 10A. The packet DMA circuit may be programmed (e.g. using the descriptor ring, in one embodiment below) to transmit a packet for storage to an address within the memory 24B. The coherency features may cause the packet to be transmitted to the system 10B, and the memory controller 14 in the system 10B may update the memory 24B with the packet data. Thus, the packet DMA circuit 16 in the system 10A may act as a remote DMA device to the memory 24B.

The packet features of the systems 10 may also be used in the line card 302A. For example, the Rx circuit 26A-26C in the system 10A that is coupled to the interface to the port aggregator circuit 310 may be programmed to direct some packets to the packet DMA circuit 16 in the system 10A and other packets to the Tx circuit 28A-28C that is coupled to the interface to the system 10B. Some of these packets may be directed to the packet DMA circuit 16 in the system 10B. Thus, the packet stream received by the port aggregator 310 may be divided between the systems 10A-10B, balancing the workload between the systems 10A-10B (if, e.g., the processors 12A-12B in a given system 10A-10B are used to process packets in the memory 24A-24B coupled to that system 10A-10B). In such embodiments, for example, the PoHT extension of the HT interface may be used to transmit the packets, sharing the HT interface between the systems 10A-10B with the coherency commands. Thus, efficiency in the interfaces may be achieved, in some embodiments, by sharing an interface between packet traffic and coherent traffic.

The port aggregator circuit 310 may be coupled to the system 10A using any packet interface (i.e. any interface that supports packet transfer). For example, in the embodiment of FIG. 1, either the SPI-4 or the HT interface may be used (where the PoHT extension is used on the HT interface). Generally, a port aggregator circuit may include any circuit configured to couple to two or more network ports and configured to aggregate received packets from the ports onto an uplink interface. The port aggregator circuit may also receive packets from the uplink interface for transmission on the network ports. The port aggregator circuit 310 may aggregate packets from the various network ports to the uplink packet interface to the system 10A. For example, in one embodiment up to 12 1-Gigabit Ethernet network ports may be supported (e.g. using the GMII interface described above). An exemplary chip of this type may be the BCM 8842 available from Broadcom Corporation. In other embodiments, the port aggregator circuit 310 may be coupled to one high speed port (e.g. 1 10-Gigabit Ethernet port) and may retransmit received packets on the interface to the system 10A. An exemplary chip of this type may be the BCM 8871 available from Broadcom Corporation.

It is noted that, while one port aggregator circuit 310 is shown in the embodiment of FIG. 3, other embodiments may include multiple port aggregator circuits 310 coupled to other systems 10. For example, if a third system 10 were included in the line card 302A, a second port aggregator circuit 310 could be coupled to the third system 10. A second port aggregator circuit 310 could also be coupled to the system 10B.

In some embodiments, one or more coprocessors 312A-312B may be included in the line card 302A. Generally, a coprocessor may include any circuitry designed to perform a specified function on an input to produce an output. In the embodiment of FIG. 2, the coprocessors 312A-312B may be defined to perform a packet processing function. For example, one or more coprocessors 312A-312B may be configured to perform the lookup packet processing function (in which the packet is looked up in various routing tables that may be programmed into the line card 302A). In another example, one or more coprocessors 312A-312B may be a security processor (e.g. the BCM 5850 available from Broadcom Corporation) configured to perform various secure packet processing functions (e.g. encryption/decryption and/or authentication according to the secure internet protocol (IPSec) standard). A system 10A-10B may transmit a packet to the coprocessor 312A-312B for processing, and receive the processed packet back from the coprocessor 312A-312B. For example, the processors 12A-12N may be programmed to transmit the packets as part of the packet processing program, or the Rx circuit 26A-26C that receives a packet may be programmed to route the packet to the Tx circuit 28A-28C that is coupled to the interface to the coprocessor 312A-312B. The interface to the coprocessor 312A-312B may be any interface, according to the design of the coprocessor 312A-312B. For example, the HT interface is shown in FIG. 3. Alternatively, the SPI-4 interface may be used in other embodiments. It is noted that the coprocessors 312A-312B may be optional and thus may be eliminated in other embodiments.

System 10A may determine that one or more packets are to be transmitted to another line card 302B-302E or to the network service card 304, and may transmit these packets to the system 10B. The system 10B may forward these packets to the switch interface circuit 314 (along with any packets that the system 10B determines are to be transmitted to another line card 302B-302E or to the network service card 304). The interface between the switch interface circuit 314 and system 10B may be any interface capable of carrying packets (e.g. SPI-4 or the HT interface with the PoHT extension, in some embodiments). Generally, a switch interface circuit may include any circuit which is capable of interfacing to a switch fabric. For example, in one embodiment, one or more BCM 8320 chips (available from Broadcom Corporation) may be used.

Packets may also be received by the switch interface circuit 314 from the switch fabric, and these packets may be transmitted by the switch interface circuit 314 to the system 10B. The system 10B may pass the packets on to the system 10A (which may pass the packets on to the port aggregator circuit 310 for transmission on a designated port) without processing in either system 10 (by appropriate programming of the Rx circuits in the systems 10A-10B). Alternatively, either of the systems 10A-10B may process the packet to determine which of the network ports is designated to transmit the packet.

It is noted that, while two systems 10A-10B are shown in the line card 302A of FIG. 3, other embodiments may employ additional systems 10 as desired. In such embodiments, the coherency and/or packet features of the systems 10 may be used to scale to the number of included systems 10.

Figure 3A:
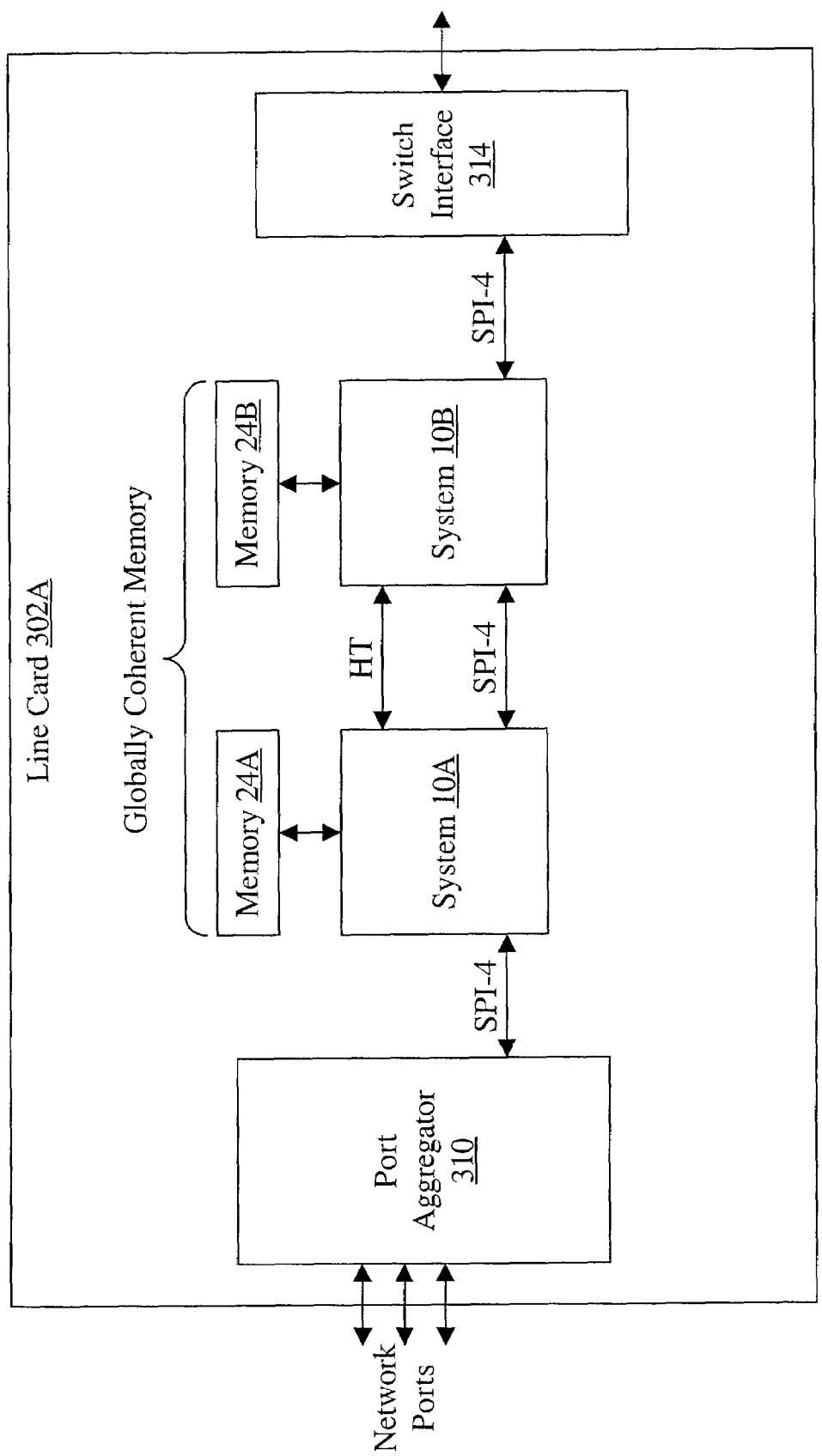
FIG. 3a is a block diagram of a second embodiment of a line card shown in FIG. 2.

FIG. 3a is a second embodiment of the line card 302A. Other line cards 302B-302E may be similar. In the embodiment of FIG. 3a, the line card 302A includes the port aggregator circuit 310, systems 10A and 10B, memories 24A and 24B, and the switch interface circuit 314. As shown in FIG. 3a, the port aggregator circuit 310 is coupled to the system 10A using a SPI-4 interface. The system 10A is coupled to the memory 24A, and the system 10B is coupled to the memory 24B. The system 10A is coupled to the system 10B using an HT interface and a SPI-4 interface. The system 10B is coupled to the switch interface circuit 314 using a SPI-4 interface.

The SPI-4 interfaces between the port aggregator 310, the systems 10A-10B, and the switch interface circuit 314 may provide a "fast path" for packets that are not processed in the systems 10A-10B. That is, packets may: be received into the port aggregator circuit 310 from the network ports; travel the SPI-4 interface to an Rx circuit 26 in the system 10A; be routed by the Rx circuit 26 in the system 10A to a Tx circuit 28 in the system 10A that is coupled to the SPI-4 interface to the system 10B (bypassing the packet DMA circuit 16 and any processing in the processors 12A-12N); travel the SPI-4 interface to an Rx circuit 26 in the system 10B; be routed by the Rx circuit 26 to a Tx circuit 28 coupled to the SPI-4 interface to the switch interface circuit 314 (bypassing the packet DMA circuit 16 and any processing in the processors 12A-12N); and travel the SPI-4 interface to the switch interface 314. Packets received by the switch interface circuit 314 from the switch fabric 306 may travel in the opposite direction through the "fast path" to the network ports. At the same time, packets that are to be processed may be captured (from either direction) using the packet DMA circuit 16 in either system 10A or 10B, and may be processed.

The HT interface between the systems 10A and 10B may be used to maintain global coherency of the memories 24A and 24B. Thus, a processor 12A-12N in either system 10A-10B may access data in either memory 24A-24B. Packets may be processed from either memory, and data structures used in the packet processing may be stored in either memory.

It is noted that, in other embodiments, one or more of the SPI-4 interfaces may be HT interfaces using the PoHT extension. It is further noted that, in other embodiments, more than two systems 10 may be included. Coherency may be maintained among the systems 10 using HT interfaces coupled to a coherent switch external to the systems 10. In other embodiments in which the systems 10 include more than 3 interface circuits 20, the additional systems may be interconnected directly using HT interfaces and the HTcc extension.

FIG. 4 is a third embodiment of the line card 302A and an embodiment of an expansion card 320. Other line cards 302B-302E may be similar and may have similar expansion cards. In the embodiment of FIG. 4, the line card 302A includes the port aggregator circuit 310 coupled to the network ports and to the system 10A, similar to the embodiment of FIG. 3. The system 10A is also coupled to the memory 24A and to the switch interface circuit 314 similar to the discussion above with regard to the system 10B and the switch interface circuit 314. Furthermore, the system 10A may be couplable to the expansion card 320 via an interface (e.g. an HT interface, in the illustrated embodiment). The expansion card 320 includes a system 10B coupled to the interface to the system 10A and to a memory 24B. Optionally, the expansion card 320 may include additional systems 10 (e.g. the system 10C coupled to the system 10B in FIG. 4) and corresponding memories (e.g. the memory 24C coupled to the system 10C). Optionally, the expansion card 320 may include one or more coprocessors (e.g. the coprocessor 312A coupled to the system 10B in FIG. 4).

The embodiment of FIG. 4 illustrates how the coherency and/or packet features of the systems 10 may be used to scale the line card 302A to larger numbers of systems 10 as the packet processing needs may dictate. The line card 302A may initially be deployed in a network device 300, and may supply the initial packet processing needs of the network device 300. As the packet processing needs increase, the expansion card 320 may be added to the network device 300. The additional memory (e.g. the memory 24B) and the original memory 24A may be coherently accessed across the systems 10. Additionally, packets may be transmitted between the systems 10 as discussed above with regard to FIG. 3.

While the embodiment of FIG. 4 uses an expansion card 320 (which may be a circuit card separate from the line card 302A), other embodiments may implement similar expandable functionality by providing expansion sockets on the line card 302A for insertion of additional systems 10 and corresponding memories 24.

FIG. 5 is a block diagram of one embodiment of the network service card 304. In the embodiment of FIG. 5, the network service card 304 includes systems 10A-10D coupled to corresponding memories 24A-24D. The systems 10A-10D are interconnected via interfaces as illustrated in FIG. 5 (e.g. HT interfaces, in the illustrated embodiment). The network service card 304 also includes coprocessors 312A-312B, coupled to systems 10A and 10C, respectively (e.g. with HT or SPI-4 interfaces, in the illustrated embodiment). The systems 10B and 10D are coupled to the switch interface circuit 314 (e.g. with HT or SPI-4 interfaces, in the illustrated embodiment). The switch interface circuit 314 is further coupled to the switch fabric 306, during use.

The systems 10A-10D may access the memories 24A-24D in a coherent fashion across the systems 10A-10D. The processors included in the systems 10A-10D may thus perform deep packet processing on packets stored anywhere within the memories 24A-24D. Packets may be passed among the systems 10A-10D using the packet features of the systems 10 as well. The packet communication may be used, for example, to transmit packets being processed by the systems 10B or 10D to one of the coprocessors 312A-312B for processing, or to pass processed packets from the systems 10A or 10C to the switch interface circuit 314 for transmission on the switch fabric 306.

It is noted that, while 4 systems 10 are illustrated in FIG. 5, other embodiments may employ more or fewer systems, as desired. Furthermore, embodiments similar to the discussion of FIG. 4 are contemplated to permit expandability of the network service card 304.

While FIGS. 3-5 illustrate various uses of the system 10 in network cards (e.g. line cards or network service cards), system 10 may be used in other types of cards/devices as well. FIG. 6 is a block diagram of one embodiment of a storage card 330. In the embodiment of FIG. 6, the storage card 330 includes systems 10A-10D coupled to respective memories 24A-24D. The systems 10B and 10D may be coupled to the switch interface circuit 314, similar to the network service card embodiment shown in FIG. 5. The systems 10A and 10C are respectively coupled to bridges 332A and 332B. The bridges 332A-332B are respectively coupled to fibre channel interface circuits 334A-334B. The fibre channel interface circuits 334A-334B are coupled to fibre channel interfaces, to which fibre channel devices (not shown) may be coupled.

The systems 10A-10D may generally be configured to process received packets from the switch interface circuit 314, and to generate commands on the interfaces to the bridges 332A or 332B in response to the packets. The packets may specify I/O commands to be performed, the device to which they are to be performed, etc., and the systems 10A-10D may use the specified information to generate the commands. The commands are then routed to the system 10A or 10C (dependent on the destination of the command), which transmits the commands to the corresponding bridge 332A or 332B. In the illustrated embodiment, the interfaces to the bridges 332A-332B are HT interfaces, and thus standard HT commands may be used. The bridge 332A or 332B receives the commands and generated corresponding commands on the interface to the fibre channel interface circuit 334A or 334B. For example, the interfaces between the bridges 332A-332B and the fibre channel interface circuits 334A-334B may be PCI, in one embodiment. Other embodiments may employ any other I/O interface, as desired (e.g. USB, firewire, etc.). The fibre channel interface circuit 334A or 334B generates corresponding fibre channel commands to communicate with the destination fibre channel device.

Similarly, the fibre channel devices may respond to commands (e.g. a read command may receive read data from the fibre channel device). The responses may travel through the fibre channel interface circuit 334A or 334B and the bridge 332A or 332B to the system 10A or 10C. The systems 10A-10D may generate packets to transmit the responses through the switch interface circuit 314.

The systems 10A-10D may use the coherency and/or packet features to efficiently route and process packets in the storage card 330, in an analogous fashion to the network service card 304 and line card 302A embodiments described above with respect to FIGS. 3-5. The coherency, packet, and noncoherent (I/O) traffic may share the same HT interfaces between the systems 10A-10D.

It is noted that, while bridges 332A-332B are included in the present embodiment, other embodiments may not employ bridges. For example, if the storage card 330 is designed to communicate with HT I/O devices, bridges 332A-332B (and interface circuits 334A-334B) may not be required. Furthermore, in some embodiments, the bridges 332A-332B may bridge directly to the desired I/O interface, and thus the interface circuits 334A-334B may not be required. While fibre channel was used as an example in this embodiment, other embodiments may employ any I/O interface as the I/O interface to which the storage card 330 communicates. Generally, the storage card 330 may include one or more I/O subsystems for communicating between the systems 10A-10D and one or more I/O devices. The I/O subsystems may comprise an interface, a bridge, an interface circuit, or combinations thereof.

FIGS. 3-6 have illustrated various embodiments of line cards, network service cards, and storage cards. Other embodiments of any of the above may be configured as standalone devices that may couple to a network. For example, the storage card 330 may be a stand along storage system that may be coupled to a network if the switch interface circuit 314 were replace with a network interface (e.g. a media access controller (MAC) to one or more Ethernet interfaces). The storage card 330 may be a standalone device in, e.g., NAS or SAN configurations. The storage card 330 may be a storage device to be coupled to a peripheral interface (e.g. PCI, USB, etc.) if the switch interface circuit 314 were replaced with a bridge to a peripheral interface. Similarly, the line card 302A may be a standalone packet switch, router, etc. In such embodiments, the switch interface circuit 314 may be eliminated (using the port aggregator to achieve network connectivity) or may be replaced by another port aggregator or similar circuit (e.g. MAC). The network service card 304 may similarly be a standalone device in the same manner as the line card 302A.

FIGS. 7-18 illustrate additional details regarding one embodiment of system 10 that may be employed in the embodiments illustrated in FIGS. 3-6.

Packet Virtual Channels

Figure 7:
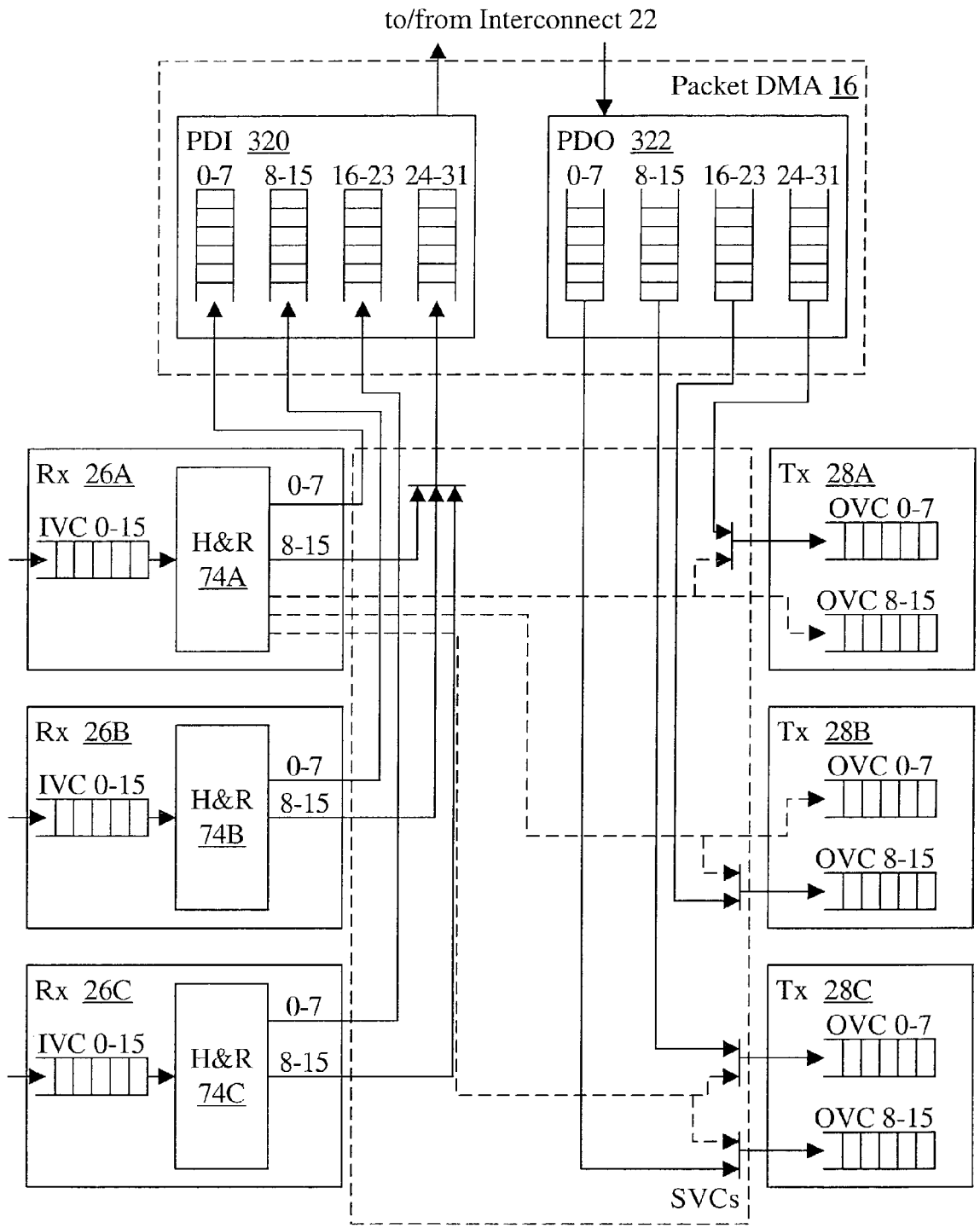
FIG. 7 is a block diagram illustrating one embodiment of virtual channels in the integrated circuit of FIG. 1.

Turning now to FIG. 7, a block diagram illustrating one embodiment of packet virtual channels in the system 10 is shown. In the illustrated embodiment, the Rx circuits 26A-26C and the Tx circuits 28A-28C are shown. Additionally, the packet DMA circuit 16 is shown as including an input packet DMA circuit (PDI) 320 and an output packet DMA circuit (PDO) 322. The PDI 320 is coupled to transmit write transactions on the interconnect 22 to write received packets to memory. The PDO 322 is coupled to transmit read transactions on the interconnect 22 and to receive the read data comprising packets to be transmitted from the system 10.

Each Rx circuit 26A-26C supports a set of input virtual channels (IVCs) defined by the interface from which the Rx circuit receives packet data. For example, the SPI-4 interface and the HT interface may both support 16 virtual channels in hardware (although more may be used by software in the SPI-4 interface, since an 8 bit virtual channel value is supported). Thus, each Rx circuit 26A-26C supports 16 IVCs (numbered 0-15 in FIG. 7). Similarly, each Tx circuit 28A-28C supports 16 output virtual channels (OVCs), numbered 0-15 in FIG. 7. Other embodiments may employ more or fewer IVCs and OVCs according to the interfaces supported by those embodiments. The PDI 320 includes a logical set of input queues (e.g. 32 in the illustrated embodiment, numbered 0-31, although more or fewer input queues may be included in other embodiments). The PDO 322 includes a logical set of output queues (e.g. 32 in the illustrated embodiment, numbered 0-31, although more or fewer output queues may be included in other embodiments).

Each Rx circuit 26A-26C includes a hash and route (H&R) circuit 74A-74C in the illustrated embodiment, which maps packets from the IVCs to a switch virtual channel (SVC). The SVC is used as the internal virtual channel for the system 10, and in particular is used to transmit packets through the switch 18 to the packet DMA circuit 16 or to the Tx circuits 28A-28C. Viewed in another way, requests to transmit packet data through the switch 18 are made based on the SVC of the packet, which identifies both the destination of the packet (e.g. the PDO 320 or one of the Tx circuits 28A-28C) and the virtual channel at the destination. The SVC may also be referred to herein as a destination and the virtual channel at the destination.

In the illustrated embodiment, the H&R circuits 74A-74C may map the IVCs to one of 16 PDI VCs (numbered 0-15 in FIG. 7, using solid lines from the H&R circuits 74A-74C). These PDI VCs may be further mapped to input queues in the PDI 320, e.g. using a register to which the H&R circuits 74A-74C is coupled (see FIG. 8 below). That is, VCs at the PDI 320 may correspond directly to input queues, or input queues may each be a VC in the PDI 320. In the illustrated embodiment, PDI VCs are mapped to input queues in blocks of eight (e.g. PDI VC 0 is either input queue 0, 8, 16, or 24; PDI VC 1 is either input queue 1, 9, 17, or 25; etc.). In other embodiments, each PDI VC may be individually mappable to an input queue, or other sized blocks of input queues may be mappable to PDI VCs. In yet another embodiment, the H&R circuits 74A-74C may directly map IVCs to PDI input queues (e.g. without the intermediate step of PDI VCs). Additionally, the H&R circuits 74A-74C may map packets from an IVC to an OVC in one of the Tx circuits 28A-28C, illustrated for H&R block 74A with dashed lines through the SVCs block to the Tx circuits 28A-28C.

The H&R circuits 74A-74C may be used to split packets from the same IVC to different SVCs (e.g. different input queues in the PDI and/or OVCs in the Tx circuits 28A-28C). Thus, the H&R circuits 74A-74C may provide software flexibility to separate packets for processing versus packets to be passed through the Tx circuits 28A-28C based on various packet attributes (such as header values or IVCs), or may provide for separating packets into different input queues in the PDI 320 (e.g. for different types of processing) based on various packet attributes. The H&R circuits 74A-74C may also be programmed to map IVCs to SVCs without using any additional packet attributes, or a combination of such mappings and other mappings using additional packet attributes, as desired. In other embodiments, the Rx circuits 26A-26B may not include H&R circuits and may instead use a programmable or fixed mapping of each IVC to a specified SVC (Tx circuit 28A-28C and OVC in that circuit or PDI 320 and an input queue in the PDI 320). It is noted that packets which are routed from an Rx circuit 26A-26C directly to a Tx circuit 26A-26C bypass the packet DMA circuit 16, the memory 24, and processing by the processors 12A-12N.

The PDO 322 output queues are also mapped to various Tx circuits 28A-28C and to OVCs in those Tx circuits 28A-28C. In the illustrated embodiment, output queues are mapped to Tx circuits and OVCs in blocks of 8, similar to the mapping of UVCs to input queues. Other embodiments may map output queues individually, or in other-sized blocks, as desired. In one embodiment, the PDO 322 includes a configuration register or registers programmed with the mapping of each block of 8 output queues to a corresponding group of SVCs (which identify the Tx circuit 28A-28C and the OVC within that Tx circuit). Other embodiments may use more elaborate mapping mechanisms similar to H&R circuits, to map packets based on packet attributes in addition to output queues, if desired.

FIG. 7 illustrates, via the solid arrows between the H&R circuits 74A-74C and the PDI 320, an exemplary mapping from the PDI VCs of the H&R circuits 74A-74C to the input queues of the PDI 320. The exemplary mapping is but one example of the mappings that may be used, as programmed into the Rx circuits 26A-26C by software. In the example, PDI VCs 0-7 from the H&R circuit 74A are mapped to input queues 0-7; PDI VCs 0-7 from the H&R circuit 74B are mapped to input queues 8-15; PDI VCs 0-7 from the H&R circuit 74C are mapped to input queues 16-23; and PDI VCs 8-15 from each of the H&R circuits 74A-74C are merged to input queues 24-31. When mappings merge the PDI VCs from different H&R circuits 74A-74C, the switch 18 may perform the merging on packet boundaries. That is, when a given Rx circuit 26A-26C has been granted to transfer a packet to an input queue that is merged among the Rx circuits 26A-26C, the switch inhibits granting any other Rx circuit 26A-26C on that input queue until the granted Rx circuit 26A-26C reaches a packet boundary. Any combination of PDI VCs from different Rx circuits 26A-26C may be merged into input queues, as desired in various mappings.

FIG. 7 also illustrates, via the solid arrows between the PDO 322 and the Tx circuits 28A-28C, an exemplary mapping of output queues to Tx circuits and OVCs. The exemplary mapping is but one example of mappings that may be used, as programmed by software. In the illustrated mapping, output queues 0-7 are mapped to OVCs 8-15 in the Tx circuit 28C; output queues 8-15 are mapped to OVCs 0-7 in the Tx circuit 28C; output queues 16-23 are mapped to OVCs 8-15 in the Tx circuit 28B; and output queues 24-31 are mapped to OVCs 0-7 in the Tx circuit 28A. Additionally, Rx circuits 26A-26C may map IVCs to OVCs, and thus there may be merging of packets from Rx circuits 26A-26C and output queues to an OVC. Again, the switch 18 may handle this merging on packet boundaries.

The input queues of the PDI 320 and the output queues of the PDO 322 may be logical queues. That is, the queues may actually be implemented in memory 24. The PDI 320 and the PDO 322 may include buffers to buffer the packet data being transmitted to and from the memory 24. The queues may be implemented in any fashion. In one particular embodiment, each queue is implemented as a descriptor ring which identifies memory buffers to store packet data corresponding to a given input queue. In other embodiments, the queues may be implemented in any desired fashion (e.g. contiguous memory locations, etc.).

It is noted that, while the Rx circuits 26A-26C and the Tx circuits 28A-28C are described with respect to FIG. 7 as supporting various packet virtual channels for packets, these circuits also support coherent virtual channels for the coherent traffic and noncoherent virtual channels for the noncoherent traffic. The coherent virtual channels may flow to the memory bridge 32, or to a Tx circuit 28A-28C, based on a comparison of the node number in the configuration register 38 and the address of the coherency command to be transmitted. Similarly, the noncoherent virtual channels may flow to the memory bridge 32 and the Tx circuits 28A-28C.

Rx Circuit

Figure 8:
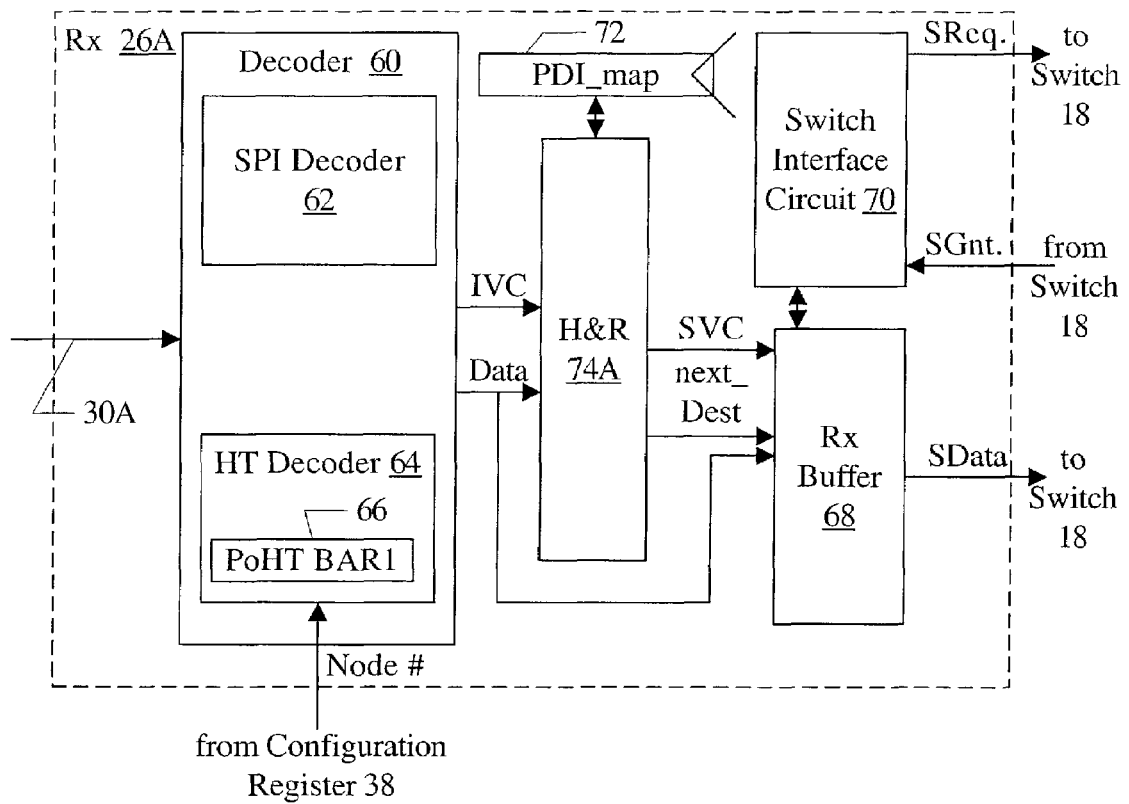
FIG. 8 is a block diagram of one embodiment of an Rx circuit shown in FIG. 1.

Turning next to FIG. 8, a more detailed diagram of a portion of one embodiment of the Rx circuit 26A is shown. Other Rx circuits 26B-26C may be similar. In the embodiment of FIG. 8, the Rx circuit 26A includes a decoder 60 (which includes a SPI decoder 62 and an HT decoder 64 including a PoHT BAR1 register 66), a hash and route (H&R) circuit 74A, an Rx buffer 68, a switch interface circuit 70, and a PDI_map register 72. The decoder 60 is coupled to receive input data on the interface 30A, and is coupled to provide an input virtual channel (IVC) and the data to the H&R circuit 74A (if the data is packet data). The decoder 60 is also coupled to provide the data to the Rx buffer 68 for storage. The H&R block 74A is configured to generate a switch virtual channel (SVC) and optionally a next destination (next_dest) value, which are received by the Rx buffer 68. The Rx Buffer 68 is coupled to the switch 18 (particularly the source data path (Sdata in FIG. 8) of the switch 18) and is coupled to the switch interface circuit 70. The hash and route circuit 74A is coupled to the PDI_map register 72 as well. The IVC may be the virtual channel on the interface 30A, and the SVC indicates the destination (within the system 10) and the virtual channel at the destination.

The decoder 60 receives the input data from the interface 30A and decodes the data according to the SPI specification (in the SPI decoder 62) or the HT specification (in the HT decoder 64). One of the decoders 62 and 64 is active dependent on which interface 30A the Rx circuit 26A is coupled to. The active decoder 62 or 64 may be selected in any desired fashion. The PoHT extension to the HT interface defines an address range (stored in the PoHT BAR1 register 66) to which HT sized-write commands may be directed in order to transmit packet data. The IVC may be carried in the sequence ID field of the HT packet, and the least significant bits of the address may indicate whether the data is the start of packet, middle of packet, or end of packet, the number of valid bytes in the last doubleword of the HT packet, and an error status. If an HT sized-write is decoded, and the address is in the address range indicated by the PoHT BAR1 register, the HT packet is a PoHT packet and the data transmitted with the sized write is packet data.

The HT decoder 64 may also decode coherency commands and noncoherent (e.g. standard HT) commands, and may output the IVC for these commands. The SVC may indicate the destination is the memory bridge 32 or one of the Tx circuits 28A-28C, and the virtual channel at the memory bridge 32/Tx circuit 28A-28C may be the same as the IVC.

Figure 9:
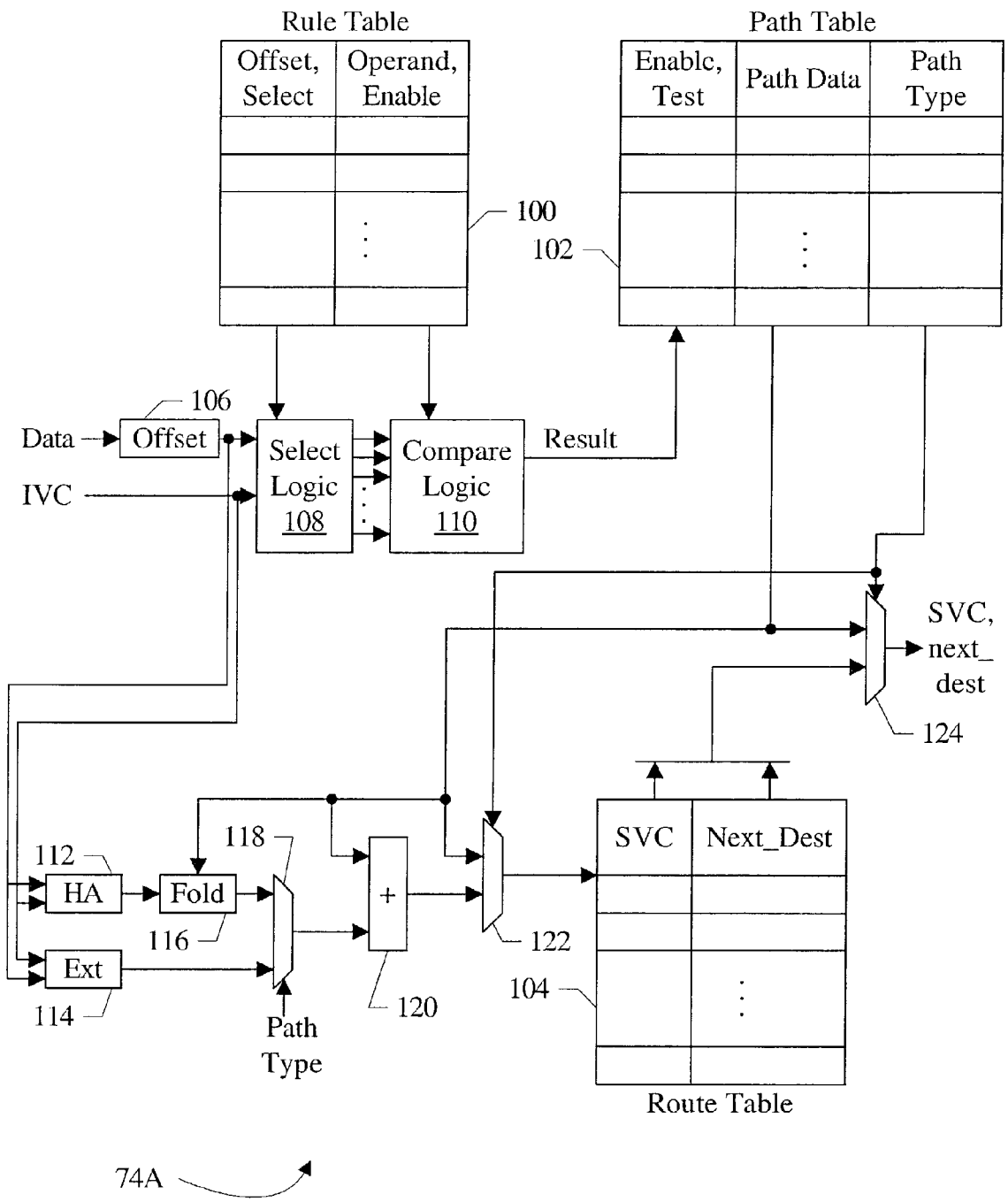
FIG. 9 is a block diagram of one embodiment of an H&R block shown in FIG. 8.

The decoder 60 provides the IVC of the packet and the received packet data to the H&R circuit 74A. The H&R circuit 74A may select bytes of the packet data and/or the IVC and generate a corresponding SVC. While the H&R circuit 74A may implement any hashing and mapping function, in one embodiment the H&R circuit 74A may be as shown in FIG. 9 and described below. Additionally, for HT interfaces, a next_dest may be output by the H&R circuit 74A. The next_dest value indicates, to a Tx circuit 28A-28C on an HT interface, which base address to select from a table of base addresses for the write command comprising the PoHT packet. If the SVC indicates the packet DMA circuit 16 is the destination, the H&R circuit may first determine a packet DMA circuit input (PDI) virtual channel (e.g. in a range of zero to fifteen) and then may map the PDI VC to an input queue of the packet DMA circuit (e.g. in a range of zero to 32) using the mapping specified in the $PDI_{13}$ map register 72.

The data and the SVC output by the H&R block 74A are stored in the Rx buffer 68. The Rx buffer 68 may include storage for each IVC, which may be programmably allocated to the IVCs using configuration registers (not shown).

The switch interface circuit 70 may scan the packets/commands stored in the Rx buffer 68 and generate requests for the switch 18 on the source request (SReq.) interface. When the switch 18 grants the request, the switch 18 indicates the grant on the source grant (SGnt.) interface.

In response to a grant, the switch interface circuit 70 may cause the Rx buffer 68 to transfer the next 16 bytes of the packet/command corresponding to the granted SVC. The Rx buffer 68 may free the storage from which the 16 bytes were read in response to transferring the data through the switch 18. It is noted that, while 16 bytes is used as an example above of one transfer through the switch 18, other embodiments may employ any size for the transfer.

Turning now to FIG. 9, a block diagram of one embodiment of the H&R circuit 74A is shown. H&R circuits in other Rx circuits 26B-26C may be similar. In the embodiment of FIG. 9, the H&R circuit 74A includes a rule table 100, a path table 102, a route table 104, an offset circuit 106, a select logic circuit 108, a compare logic circuit 110, a hash circuit 112, an extract circuit 114, a fold circuit 116, a multiplexor (mux) 118, an adder 120, a mux 122, and a mux 124. The offset circuit 106 is coupled to receive packet data and has an output coupled to the select logic circuit 108, the hash circuit 112, and the extract circuit 114. The IVC corresponding to the packet data is provided to the select logic circuit 108, the hash circuit 112, and the extract circuit 114. The select logic 108 is coupled to the rule table 100 and to the compare logic circuit 110, which is also coupled to the rule table 100 and to provide a result to the path table 102. The path table 102 is coupled to the muxes 118, 122, and 124, the adder 120, and the fold circuit 116. The mux 124 is coupled to the route table 104 and to provide the SVC and optionally next_dest output of the H&R circuit 74A. The route table 104 is coupled to receive an index from the mux 122, which is also coupled to the adder 120. The adder 120 is coupled to the mux 118, which is coupled to the fold circuit 116 and the extract circuit 114. The fold circuit 116 is coupled to the hash circuit 112.

In one embodiment, the H&R circuit 74A may support a number of programmable rules. Each rule selects bytes from the data (or the IVC) and compares the selected data to an operand of the rule. Each rule may be evaluated on packet data and the true/false results of each comparison may select one of a set of paths. The path may be an SVC, an index to a route table which outputs an SVC, or may select the output of a hash function or an extract function as the index to the route table (added to a base address which is also part of the path data). Additionally, for HT interfaces, the next_dest may be output.

Generally, the rule table 100, the path table 102, and the route table 104 may comprise memories which are programmable by software to generate SVCs for packets in accordance with the above. In one implementation, the entries of the rule table 100, the path table 102, and the route table 104 may be mapped into the address space of the system 10 as configuration registers which may be read and written by software.

Each entry of the rule table 100 includes an offset and select field, and an operand and enable field. The offset field specifies the offset of a word (4 bytes, in one embodiment) in the packet that is to be compared to the operand in the operand field. The enable field is a bit vector used to mask the selected word prior to the comparison. The select field selects either the word specified by the offset or the IVC for comparison. The select logic circuit 108 is coupled to receive the offset and select fields from each entry and is configured to select the specified data from the packet data or IVC for comparison. The select logic circuit 108 may select data independently for each entry and provide the data to the compare logic circuit 110. The compare logic circuit 110 may independently compare each selected data (masked by the enable field of the corresponding rule table entry) to the operand from the corresponding rule table entry. The results of the comparisons are provided to the path table 102. The results may include an indication of whether each comparison resulted in a true or false outcome. The number of entries in the rule table 100 may vary from embodiment to embodiment. In one implementation, there may be 16 rule entries allowing up to 16 programmable rules. In one embodiment, the offsets specified in the rule table are relative to a programmable offset from the beginning of the packet data. The offset circuit 106 may offset the packet data by the programmable offset. In one embodiment, the programmable offset may be direct (i.e. the programmed value may be the offset). In another embodiment, the programmable offset may be indirect (i.e. the programmed value may identify an offset field within the packet data that carries the offset for a given packet). In still another embodiment, the programmable offset may be programmable to be either direct or indirect.

The path table 102 may comprise a set of entries, each of which includes an enable and test field, a path data field, and a path type field. The enable and test field is used to program which results from the compare logic circuit 110 are used to determine if the path entry is used for this packet (via bits in the enable field corresponding to each result) and the test value may indicate whether the corresponding result is tested for true or false. If each enabled result tests the same as the test value specifies, the path table entry is selected. The path table 102 outputs the path data and path type fields from the selected path table entry. The path type field indicates one of several path types, controlling the muxes 118, 122, and 124 and indicating the nature of the path data. In an immediate path type, the SVC and optionally next_dest are specified in the path data. For the immediate path type, the mux 124 selects the path data through the mux 124. If the path type is not immediate, the output of the route table 104 is selected through the mux 124. Any number of path table entries may be supported in various embodiments, including different numbers of entries than the number of rule table entries. In one implementation, the path table 102 may include 16 entries and a $17^{th}$ (default) entry that is selected if none of the other 16 entries match the result of the compare logic circuit 110.

The route table 104 includes several entries, each storing an SVC and a next_dest value. The route table 104 receives an index generated in several possible fashions depending on the path type field. If the path type is a index path type, the path data is an index into the route table 104 and the path data is selected through the mux 122. Otherwise, the output of the adder 120 is selected through the mux 122 as the index to the route table 104.

In the remaining path types, the path data may include a base address used (by adder 120) to generate the index of the route table. In a hash path type, the output of the hash circuit 112 (a hash value) is added to the base address to generate the index (and is selected through the mux 118 to the adder 120). The hash circuit 112 may be programmed to select up to 10 words from the packet data, mask the words with programmable enable vectors, and hash them to produce the hash value. In one embodiment, there are 512 entries in the route table 104. In such an embodiment, the hash function may generate an 8 bit hash value (which may be added to a 9 bit base address in the adder 120). Additionally, in some embodiments, the path data may include a fold control which folds the hash value to a smaller value (e.g. programmably 7 bits or 6 bits in one embodiment) to reduce the portion of the route table 104 selectable via the hash circuit 112. In one implementation, the hash function bitwise XORs the upper two bytes and lower two bytes of each word to produce two bytes, then XORs adjacent sets of two bits to produce one byte (8 bits). The bytes of resulting from each word may be bitwise XOR'd to produce the hash value. The optional folding may XOR bits 7 and 5 of the hash value (numbering bits 7 to 0 from most significant to least significant) to produce bit 5 of the fold, zero bit 7, and provide the remaining hash value bits unmodified to produce a 7 bit fold, in one embodiment. To produce a 6 bit fold, one implementation may XOR bits 7 and 5 of the hash value to produce bit 5 of the fold, XOR bits 6 and 4 of the hash value to produce bit 4 of the fold, zero bits 7 and 6, and provide the remaining hash value bits unmodified to produce a 6 bit fold. If folding is not selected, the fold circuit 116 provides the unmodified hash value as the output. In other embodiments, two or more hash functions may be independently programmable in the hash circuit 112, and may be selected using the path type field.

The extract circuit 114 may be programmable to select two nibbles (4 bits) from the packet data to produce the 8 bit input to the adder 120. The two nibbles may be programmed independently and thus may be non-consecutive in the packet. In other embodiments, two or more extract functions may be programmed into the extract circuit 114 and selected using the path type field. In other embodiments, the extract result may be folded in a manner similar to the hash value.

While the embodiment of FIG. 9 provides a variety of mechanisms for generating an SVC, other embodiments may provide any subset of one or more of the direct SVC generation, the index from the path table to the route table, the hash mechanism, or the extract mechanism. Any size route table may be supported, and thus the hash value and extract result sizes may be varied.

Figure 10:
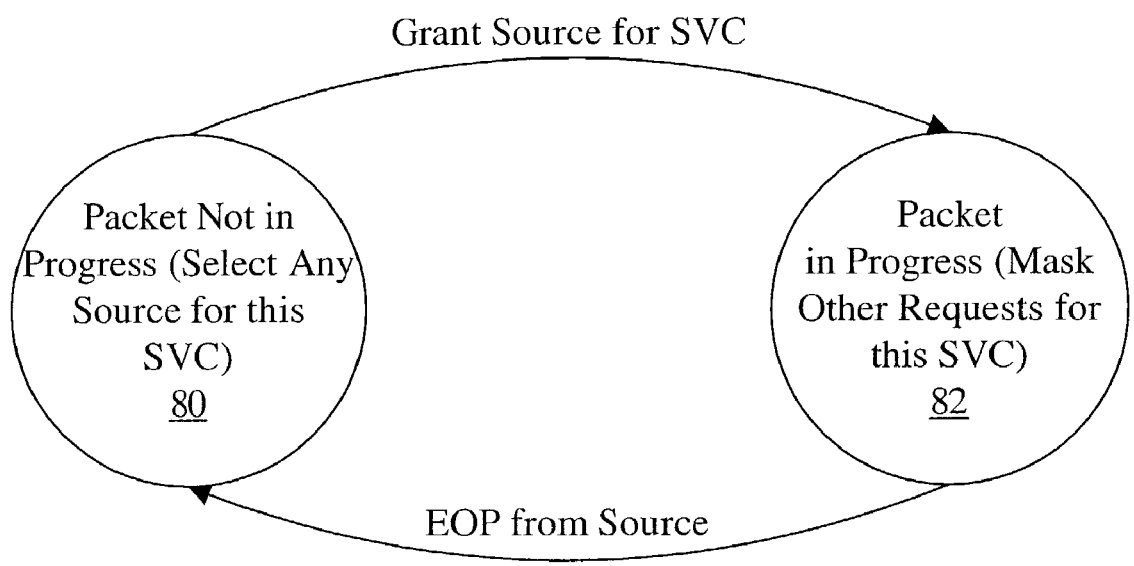
FIG. 10 is a state machine illustrating operation of one embodiment of the switch shown in FIG. 1.

Turning next to FIG. 10, a state machine diagram is shown which illustrates operation of one embodiment of the switch with respect to one SVC (one destination and virtual channel at that destination). A similar state machine may apply to each SVC.

In the packet not in progress state 80, the switch 18 may select any source to transfer data on the SVC. In state 80, the switch 18 may use any selection mechanism to select among requesters for the SVC. In one embodiment, the switch 18 uses a round robin selection scheme for the input queues of the packet DMA circuit 16 and the input buffers (on a virtual channel basis) of the memory bridge 32, and uses a programmable weighted round robin with priority scheme for the Tx circuits 28A-28C. In the programmable weighted round robin with priority scheme, each source may be programmed as high priority or low priority, and may be given a weight. In one implementation, the switch maintains deficit counters indicating how many transfers each source has not been able to transfer (based on its weight) on the SVC, and selects the requesting source with the highest deficit.

Once a source has been selected, the switch 18 transitions to the packet in progress state 82. In this state, the switch 18 records the source that was granted for this SVC and masks requests from other sources. Thus, the source that was previously granted is the only source that will be granted on the SVC. The switch may grant other sources for other SVCs corresponding to the same destination (e.g. other input queues in the packet DMA circuit 16, other virtual channel buffers in the memory bridge 32, or other output virtual channels (OVCs) in the Tx circuits 28A-28C). The switch 18 remains in this state until a request is granted to the source and the EOP indication with the request indicates end of packet. The switch 18 then transitions to the state 80 and selects the next source.

Packet DMA Circuit Descriptors

Figure 11:
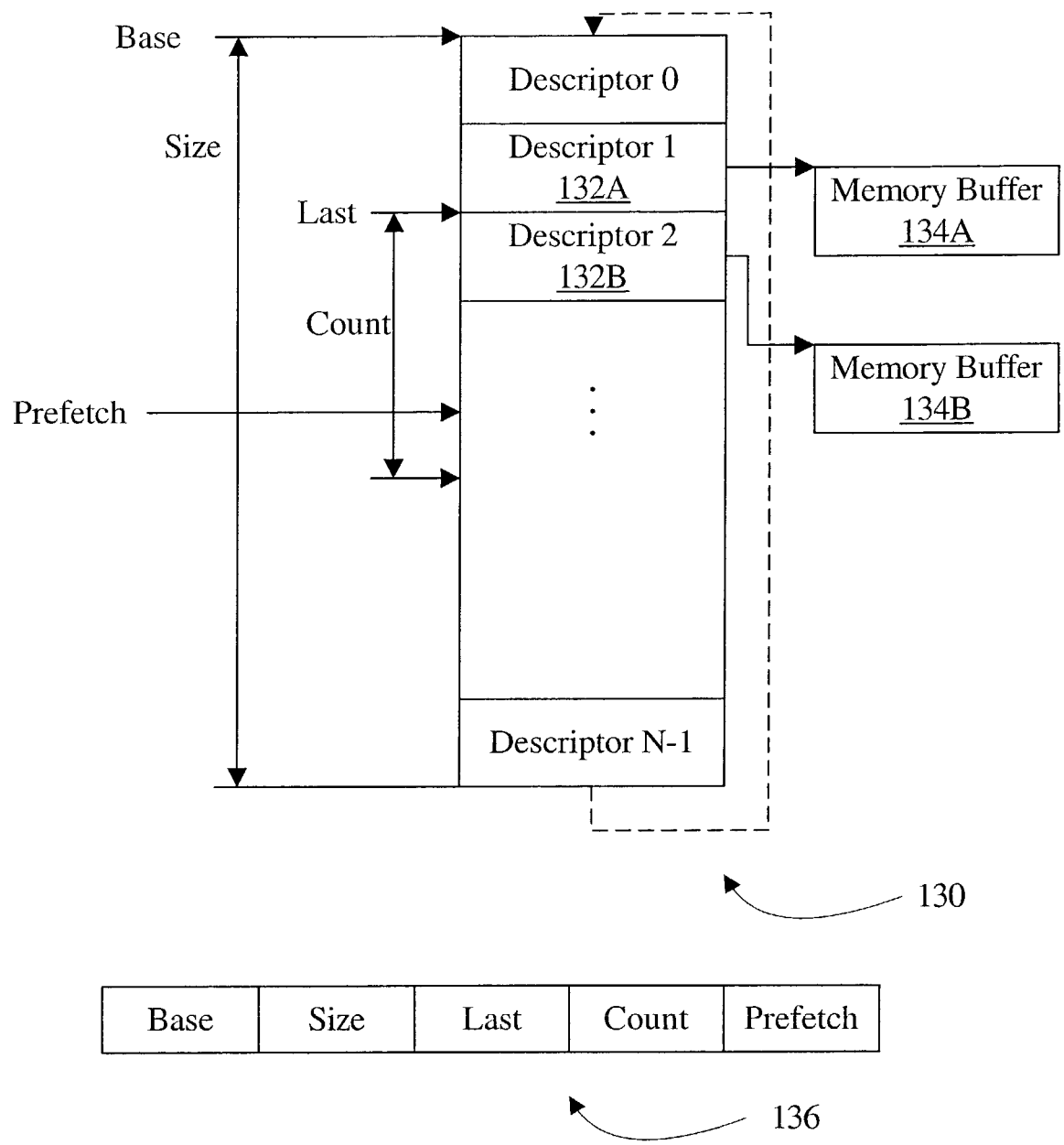
FIG. 11 is a block diagram of one embodiment of a descriptor ring which may be used by one embodiment of a packet DMA circuit shown in FIG. 1.

An exemplary descriptor ring 130 for the packet DMA circuit 16 is shown in FIG. 11, for one embodiment, along with a corresponding descriptor control register or registers 136. As mentioned above, a descriptor ring 130 may comprise an input queue (or an output queue) of the packet DMA circuit 16. Descriptor rings may be similar for both the input and output queues. In the embodiment of FIG. 11, the descriptors are stored in a memory region defined by the base address ("base" field of the registers 136 in FIG. 11) and the size ("size" field of the registers 136 in FIG. 11). The base address points to the first descriptor (descriptor 0) in memory, and the size is an offset to the end of the last descriptor (descriptor N-1). The descriptors may be used in a ring. That is, descriptors may be used in consecutive order starting at descriptor 0 and proceeding to descriptor N-1. When the last descriptor N-1 has been used, the next descriptor to be used in descriptor 0 (indicated in FIG. 11 by the dashed line from descriptor N-1 to descriptor 0).

Each descriptor points to a memory buffer (that is, the descriptor includes the address of the memory buffer), and may also include various attributes of the memory buffer. For example, in FIG. 11, the descriptor 132A points to the memory buffer 134A and the descriptor 132B points to the memory buffer 134B.

The descriptors are made available to the packet DMA circuit 16 by software. Once the packet DMA circuit 16 has used a descriptor to store a packet (or reads the packet from the descriptor for transmission), the packet DMA circuit 16 returns the descriptor to software. In one embodiment, the packet DMA circuit 16 returns a descriptor to software by resetting a hardware (HW) bit in the descriptor, described in more detail below. Alternatively, descriptors may be made available using the count field. Software sets up the descriptors in the descriptor ring, and writes the number of descriptors being made available to the count corresponding to that descriptor ring ("count" field in the registers 136 in FIG. 11). The value written to the count field is added by the packet DMA circuit 16 to the value in the count field, resulting in the count of available descriptors. The "last" field in the registers 136 in FIG. 11 is an index, measured from the base address, to the last descriptor that was used by the packet DMA circuit 16 and returned to software. Thus, the descriptors beginning with the next descriptor in the ring after the descriptor indicated by the "last" field and the following "count"-1 number of descriptors are available for packet DMA circuit use.

In one embodiment, the packet DMA circuit 16 may prefetch one or more descriptors. The "prefetch" field of the registers 136 indicates the index, measured from the base address, of the most recently prefetched descriptor. Thus, the next descriptor to be prefetched may be the descriptor in the ring which follows the descriptor indicated by the prefetch field. Alternatively, the prefetch field may indicate the next descriptor to be prefetched. In one embodiment, the packet DMA circuit 16 does not attempt to prefetch a descriptor which has not been made available by software and thus the prefetch field may generally indicate a descriptor between the "last" descriptor and the descriptor corresponding to the "last" plus the "count".

Generally, once a descriptor becomes available for a given input queue, the packet DMA circuit 16 may request data from the switch (as a destination) for that input queue. Packet data received from the switch for the input queue is stored in the memory buffer indicated by the descriptor. A packet may be stored in one or more memory buffers. Once the memory buffer is full or the packet is complete, the packet DMA circuit 16 may update the descriptor to indicate availability of the packet and may return the descriptor to software.

Once a descriptor becomes available for a given output queue, the packet DMA circuit 16 may request transfers through the switch (as a source) to transfer the packet in the descriptor to the selected destination. Once the memory buffer has been emptied, the packet DMA circuit 16 may update the descriptor to return it to software.

In one embodiment, a descriptor 132 may be smaller, in size, than a cache block. For example, a cache block may be 32 bytes in size and the descriptor may be 16 bytes. In such cases, the packet DMA circuit 16 may be configured to delay a descriptor update (if the descriptor is in the lower half of the cache block) for a period of time to possibly pair the update with the update of the descriptor in the upper half of the cache block (due to the next packet). In such cases, a read-modify-write of the cache block may be avoided.

FIG. 12 is a block diagram of one embodiment of a descriptor 132. In the embodiment of FIG. 12, the descriptor 132 comprises 16 bytes illustrated as two 8 byte words. The bit ranges for the fields within each 8 bytes are shown above the fields. Fields labeled RSVD are reserved.

The descriptor 132 includes a variety of status information stored in bits 63:55 of the first 8 byte word. In particular, a hardware bit (HW) is included. Software may set the HW bit to indicate that the descriptor 132 is available for packet DMA circuit 16 use (at least from a software point of view). Alternatively, software may indicate that one or more descriptors are available by updating the descriptor count described above. The packet DMA circuit 16 may clear the HW bit to return the descriptor to software.

The SOP and EOP bits are used to indicate whether the memory buffer corresponding to the descriptor includes the start of the packet or the end of the packet. A packet may be stored in one or more memory buffers. If the memory buffer located by the descriptor 132 includes the start of a packet, the SOP bit is set. Otherwise, the SOP bit is clear. If the memory buffer includes the end of the packet, the EOP bit is set. Otherwise, the EOP bit is clear. Thus, if a packet is stored in one memory buffer, both the EOP and SOP bits in that descriptor are set. If a packet is stored in more than one memory buffer, the SOP bit in the descriptor corresponding to the first memory buffer is set and the EOP bit in the descriptor corresponding to the last memory buffer is set. Other EOP and SOP bits in the descriptors are clear. For input queue descriptors, the packet DMA circuit 16 sets or clears the EOP and SOP bits when writing the updated descriptor back to memory after writing packet data into the memory buffer. For output queue descriptors, software sets or clears the EOP and SOP bits when generating the descriptors for the packets.

The INT bit is used to indicate if the packet DMA circuit 16 is to generate an interrupt when the descriptor is complete (e.g. when the packet DMA circuit 16 is writing the updated descriptor back to memory). Software may set the INT bit to cause the interrupt and clear the INT bit to not cause the interrupt.

The SWID may indicate the interface circuit on which the packet was received, for input queue descriptors. The LE bit may indicate, when set, that an error was encountered in the Rx circuit 26A-26C that received the packet. In particular, if the Rx circuit is receiving SPI-4 phase 2 traffic, the LE bit may indicate, when set, that a DIP-4 error occurred. The SE bit may indicate, when set, that a SPI-4 abort control word was received in the packet or an error was detected in a PoHT transaction. The PE bit may indicate, when set, that the packet DMA circuit detected an error when transferring the packet.

The buffer length field indicates the size of the memory buffer indicated by the descriptor 132 (in bytes). For input queue descriptors, the packet DMA circuit 16 may overwrite the buffer length field to indicate the actual length used to store packet data.

The next_dest field in the descriptor is used, for output queue descriptors, to store the next_dest value for PoHT packets. The packet DMA circuit 16 may read the next_dest field and transmit the value with the packet to the Tx circuit 28A-28C that is to transmit the packet.

The VC field stores the IVC for a received packet, if the packet was transmitted on the SPI interface. For output queue descriptors, the VC field may store a value for which the most significant 4 bits are transmitted to the Tx circuit 28A-28C to transmit the packet, and the Tx circuit 28A-28C may append the bits to the OVC to generate the VC field in the SPI-4 packet. The memory buffer address field stores the address of the memory buffer indicated by the descriptor 132.

It is noted that, while various bits have been described above as having certain meanings when set or clear, the opposite meanings may be assigned to the set and clear states. Generally, any indication may be used in various embodiments.

Coherency Management

Turning next to FIG. 13, a table 142 is shown illustrating an exemplary set of transactions supported by one embodiment of the interconnect 22 and a table 144 is shown illustrating an exemplary set of coherency commands supported by one embodiment of the interfaces 30. Other embodiments including subsets, supersets, or alternative sets of commands may be used.

The transactions illustrated in the table 142 will next be described. An agent in the system 10 may read a cache block (either remote or local) using the read shared (RdShd) or read exclusive (RdExc) transactions on the interconnect 22. The RdShd transaction is used to request a shared copy of the cache block, and the RdExc transaction is used to request an exclusive copy of the cache block. If the RdShd transaction is used, and no other agent reports having a copy of the cache block during the response phase of the transaction (except for the L2 cache 36 and/or the memory controller 14), the agent may take the cache block in the exclusive state. In response to the RdExc transaction, other agents in the node invalidate their copies of the cache block (if any). Additionally, an exclusive (or modified) owner of the cache block may supply the data for the transaction in the data phase. Other embodiments may employ other mechanisms (e.g. a retry on the interconnect 22) to ensure the transfer of a modified cache block.

The write transaction (Wr) and the write invalidate transaction (WrInv) may be used by an agent to write a cache block to memory. The Wr transaction may be used by an owner having the modified state for the block, since no other copies of the block need to be invalidated. The WrInv transaction may be used by an agent that does not have exclusive ownership of the block (the agent may even have the invalid state for the block). The WrInv transaction causes other agents to invalidate any copies of the block, including modified copies. The WrInv transaction may be used by an agent that is writing the entire cache block. For example, a DMA that is writing the entire cache block with new data may use the transaction to avoid a read transaction followed by a write transaction. Particularly, the packet DMA circuit 16 may use WrInv transactions to write packet data to memory.

The RdKill and RdInv transactions may be used by the memory bridge 32 in response to probes received by the system 10 from other nodes. The RdKill and RdInv transactions cause the initiator (the memory bridge 32) to acquire exclusive access to the cache block and cause any cache agents to invalidate their copies (transferring data to the initiator similar to the RdShd and RdExc transactions). In one embodiment, the RdKill transaction also cancels a reservation established by the load-linked instruction in the MIPS instruction set, while the RdInv transaction does not. In other embodiments, a single transaction may be used for probes. In still other embodiments, there may be a probe-generated transaction that invalidates agent copies of the cache block (similar to the RdKill and RdInv transactions) and another probe-generated transaction that permits agents to retain shared copies of the cache block.

The WrFlush transaction is a write transaction which may be initiated by an agent and another agent may have an exclusive or modified copy of the block. The other agent provides the data for the WrFlush transaction, or the initiating agent provides the data if no other agent has an exclusive or modified copy of the block. The WrFlush transaction may be used, in one embodiment in which the L2 cache 36 retains the node state for the system 10 but other agents may have the cache block in a modified state as well. The L2 cache 36 may use the WrFlush command to evict a remote cache block which may be modified in a cache of another agent in the system 10.

The Nop transaction is a no-operation transaction. The Nop may be used if an agent is granted use of the interconnect 22 (e.g. the address bus, in embodiments in which the interconnect 22 is a split transaction bus) and the agent determines that it no longer has a transaction to run on the interconnect 22.

The commands illustrated in the table 144 will next be described. In the table 144, the command is shown as well as the virtual channel in which the command travels on the interfaces 30. The virtual channels may include, in the illustrated embodiment: the coherent read (CRd) virtual channel; the probe (Probe) virtual channel; the acknowledge (Ack) virtual channel; and coherent fill (CFill) virtual channel. The CRd, Probe, Ack, and CFill virtual channels are defined for the HTcc commands. There may be additional virtual channels for the standard HT commands (e.g. the non-posted command (NPC) virtual channel, the posted command (PC) virtual channel, and the response virtual channel).

The cRdShd or cRdExc commands may be issued by the memory bridge 32 in response to RdShd or RdExc transactions on the interconnect 22, respectively, to read a remote cache block not stored in the node (or, in the case of RdExc, the block may be stored in the node but in the shared state). If the cache block is stored in the node (with exclusive ownership, in the case of the RdExc transaction), the read is completed on the interconnect 22 without any coherency command transmission by the memory bridge 32.

The Flush and Kill commands are probe commands for this embodiment. The memory bridge 32 at the home node of a cache block may issue probe commands in response to a cRdShd or cRdExc command. The memory bridge 32 at the home node of the cache block may also issue a probe command in response to a transaction for a local cache block, if one or more remote nodes has a copy of the cache block. The Flush command is used to request that a remote modified owner of a cache block return the cache block to the home node (and invalidate the cache block in the remote modified owner). The Kill command is used to request that a remote owner invalidate the cache block. In other embodiments, additional probe commands may be supported for other state change requests (e.g. allowing remote owners to retain a shared copy of the cache block).

The probe commands are responded to (after effecting the state changes requested by the probe commands) using either the Kill_Ack or WB commands. The Kill_Ack command is an acknowledgement that a Kill command has been processed by a receiving node. The WB command is a write back of the cache block, and is transmitted in response to the Flush command. The WB command may also be used by a node to write back a remote cache block that is being evicted from the node.

The Fill command is the command to transfer data to a remote node that has transmitted a read command (cRdExc or cRdShd) to the home node. The Fill command is issued by the memory bridge 32 in the home node after the probes (if any) for a cache block have completed.

Figure 14:
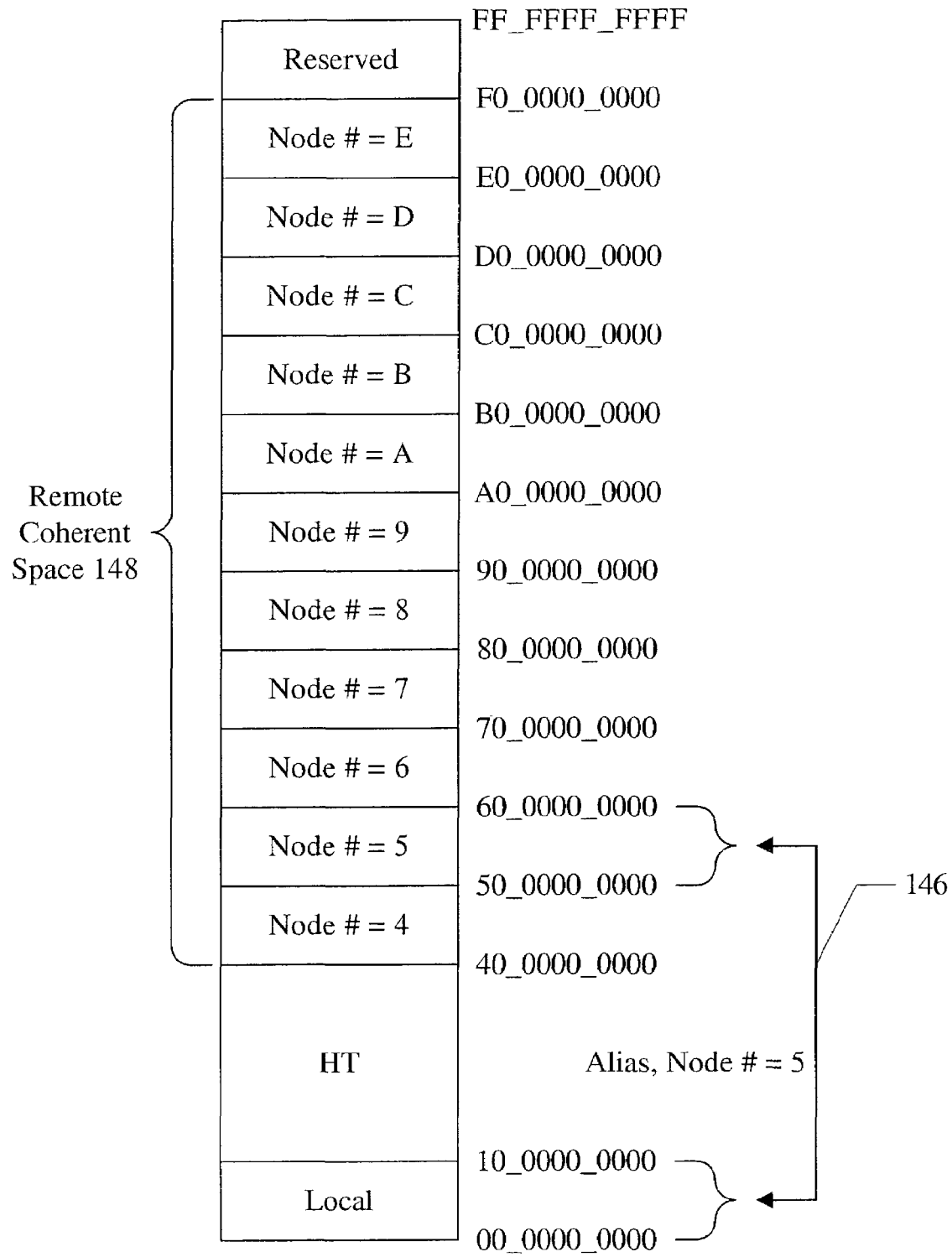
FIG. 14 is a block diagram of one embodiment of an address space used by one embodiment of the system.

Turning next to FIG. 14, a block diagram illustrating one embodiment of an address space implemented by one embodiment of the system 10 is shown. Addresses shown in FIG. 14 are illustrated as hexadecimal digits, with an under bar ("_") separating groups of four digits. Thus, in the embodiment illustrated in FIG. 14, 40 bits of address are supported. In other embodiments, more or fewer address bits may be supported.

In the embodiment of FIG. 14, the address space between 00_0000_0000 and 0F_FFFF_FFFF is treated as local address space. Transactions generated by agents in the local address space do not generate coherency commands to other nodes, although coherency may be enforced within the system 10 for these addresses. That is, the local address space is not maintained coherent with other nodes. Various portions of the local address space may be memory mapped to I/O devices, HT, etc. as desired.

The address space between 40_0000_0000 and EF_FFFF_FFFF is the remote coherent space 148. That is, the address space between 40_0000_0000 and EF_FFFF_FFFF is maintained coherent between the nodes. Each node is assigned a portion of the remote coherent space, and that node is the home node for the portion. As shown in FIG. 1, each node is programmable with a node number. The node number is equal to the most significant nibble (4 bits) of the addresses for which that node is the home node, in this embodiment. Thus, the node numbers may range from 4 to E in the embodiment shown. Other embodiments may support more or fewer node numbers, as desired. In the illustrated embodiment, each node is assigned a 64 Gigabyte (GB) portion of the memory space for which it is the home node. The size of the portion assigned to each node may be varied in other embodiments (e.g. based on the address size or other factors).

For a given coherent node, there is an aliasing between the remote coherent space for which that node is the home node and the local address space of that node. That is, corresponding addresses in the local address space and the portion of the remote coherent space for which the node is the home node access the same memory locations in the memory 24 of the node (or are memory mapped to the same I/O devices or interfaces, etc.). For example, the node having node number 5 aliases the address space 50_0000_0000 through 5F_FFFF_FFFF to 00_0000_0000 through 0F_FFFF_FFFF respectively (arrow 146). Internode coherent accesses to the memory 24 at the system 10 use the node-numbered address space (e.g. 50_0000_0000 to 5F_FFFF_FFFF, if the node number programmed into system 10 is 5) to access cache blocks in the memory 24. That is, agents in other nodes and agents within the node that are coherently accessing cache blocks in the memory use the remote coherent space, while access in the local address space are not maintained coherent with other nodes (even though the same cache block may be accessed). Thus the addresses are aliased, but not maintained coherent, in this embodiment. In other embodiments, the addresses in the remote coherent space and the corresponding addresses in the local address space may be maintained coherent.

A cache block is referred to as local in a node if the cache block is part of the memory assigned to the node (as mentioned above). Thus, the cache block may be local if it is accessed from the local address space or the remote coherent space, as long as the address is in the range for which the node is the home node. Similarly, a transaction on the interconnect 22 that accesses a local cache block may be referred to as a local transaction or local access. A transaction on the interconnect 22 that accesses a remote cache block (via the remote coherent address space outside of the portion for which the node is the home node) may be referred to as a remote transaction or a remote access.

The address space between 10_0000_0000 and 3F_FFFF_FFFF may be used for additional HT transactions (e.g. standard HT transactions) in the illustrated embodiment. Additionally, the address space between F0_0000_0000 and FF_FFFF_FFFF may be reserved in the illustrated embodiment.

It is noted that, while the most significant nibble of the address defines which node is being accessed, other embodiments may use any other portion of the address to identify the node. Furthermore, other information in the transaction may be used to identify remote versus local transactions, in other embodiments (e.g. command type, control information transmitted in the transaction, etc.).

Figure 15:
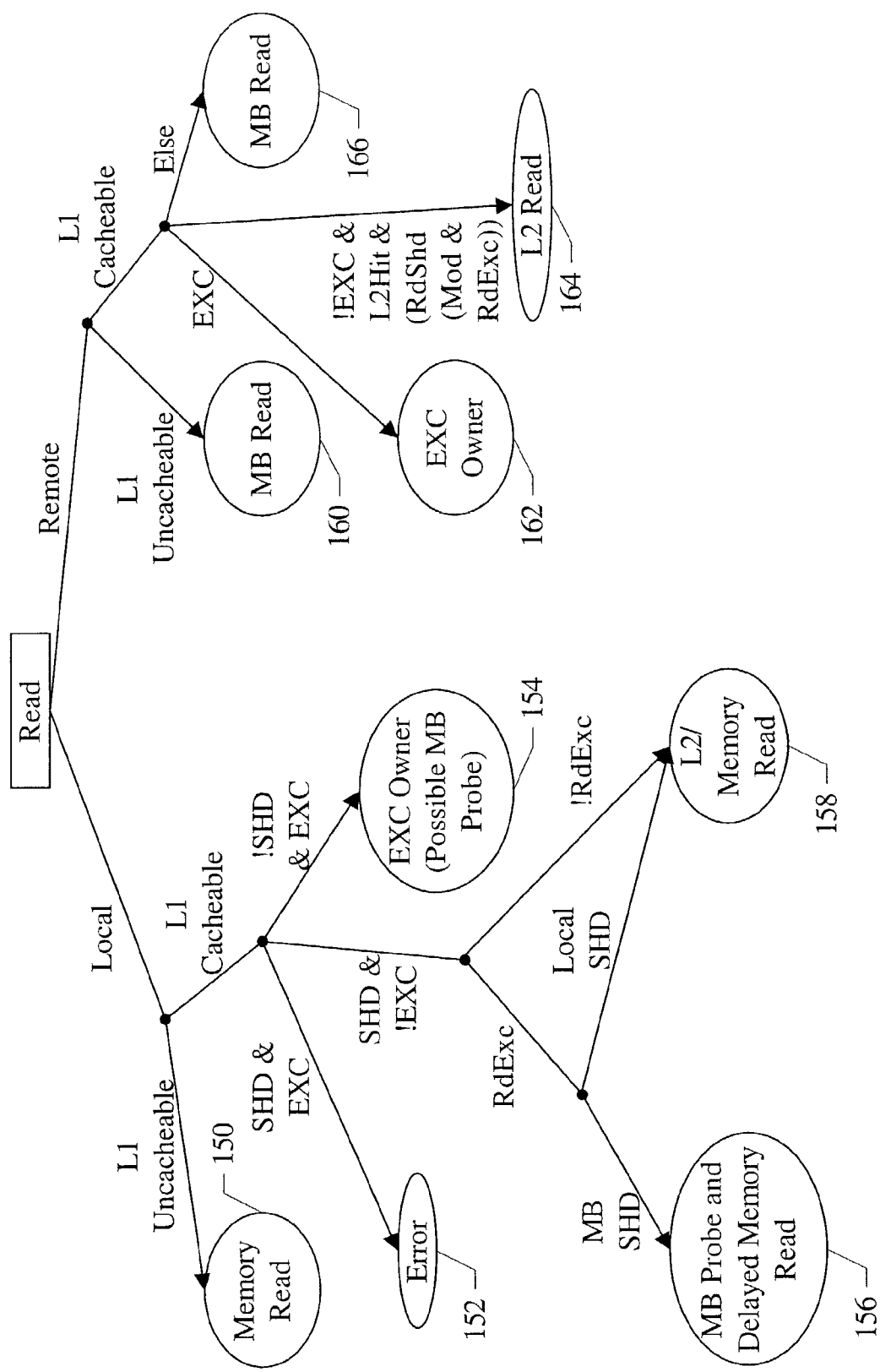
FIG. 15 is a decision tree illustrating operation of one embodiment of a node for a read transaction on the interconnect within the system.

Turning next to FIG. 15, a decision tree for a read transaction to a memory space address on the interconnect 22 of a system 10 is shown for one embodiment. The decision tree may illustrate operation of the system 10 for the read transaction for different conditions of the transaction, the state of the cache block accessed by the transaction, etc. The read transaction may, in one embodiment, include the RdShd, RdExc, RdKill, and RdInv transactions shown in the table 142 of FIG. 13. Each dot on the lines within the decision tree represents a divergence point of one or more limbs of the tree, which are labeled with the corresponding conditions. Where multiple limbs emerge from a dot, taking one limb also implies that the conditions for the other limbs are not met. In FIG. 15, the exclamation point ("!") is used to indicate a logical NOT. Not shown in FIG. 15 is the state transition made by each coherent agent which is caching a copy of the cache block for the read transaction. If the read transaction is RdShd, the coherent agent may retain a copy of the cache block in the shared state. Otherwise, the coherent agent invalidates its copy of the cache block.

The transaction may be either local or remote, as mentioned above. For local transactions, if the transaction is uncacheable, then a read from the memory 24 is performed (reference numeral 150). In one embodiment, the transaction may include an indication of whether or not the transaction is cacheable. If the transaction is uncacheable, it is treated as a non-coherent transaction in the present embodiment.

If the local transaction is cacheable, the operation of the system 10 is dependent on the response provided during the response phase of the transaction. In one embodiment, each coherent agent responds with the state of the cache block in that agent. For example, each coherent agent may have an associated shared (SHD) and exclusive (EXC) signal. The agent may signal invalid state by deasserting both the SHD and EXC signals. The agent may signal shared state by asserting the SHD signal and deasserting the EXC signal. The agent may signal exclusive state (or modified state) by asserting the EXC signal and deasserting the SHD signal. The exclusive and modified states may be treated the same in the response phase in this embodiment, and the exclusive/modified owner may provide the data. The exclusive/modified owner may provide, concurrent with the data, an indication of whether the state is exclusive or modified. While each agent may have its own SHD and EXC signals in this embodiment (and the initiating agent may receive the signals from each other agent), in other embodiments a shared SHD and EXC signal may be used by all agents.

If both the SHD and EXC responses are received for the local transaction, an error has occurred (reference numeral 152). The memory controller may return a fatal error indication for the read transaction, in one embodiment. If the response is exclusive (SHD deasserted, EXC asserted), the exclusive owner provides the data for the read transaction on the interconnect 22 (reference numeral 154). If the exclusive owner is the memory bridge 32 (as recorded in the remote line directory 34), then a remote node has the cache block in the modified state. The memory bridge 32 issues a probe (Flush command) to retrieve the cache block from that remote node. The memory bridge 32 may supply the cache block returned from the remote node as the data for the read on the interconnect 22.

If the response is shared (SHD asserted, EXC deasserted), the local transaction is RdExc, and the memory bridge 32 is one of the agents reporting shared, then at least one remote node may have a shared copy of the cache block. The memory bridge 32 may initiate a probe (Kill command) to invalidate the shared copies of the cache block in the remote node(s) (reference numeral 156). In one embodiment, the data may be read from memory (or the L2 cache 36) for this case, but the transfer of the data may be delayed until the remote node(s) have acknowledged the probe. The memory bridge 32 may signal the memory controller 14/L2 cache 36 when the acknowledgements have been received. In one embodiment, each transaction may have a transaction identifier on the interconnect 22. The memory bridge 32 may transmit the transaction identifier of the RdExc transaction to the memory controller 14/L2 cache 36 to indicate that the data may be transmitted.

If the response is shared, the local transaction is RdExc, and the sharing agents are local agents (i.e. the memory bridge 32 does not report shared), then the L2 cache 36 or the memory controller 14 may supply the data, depending on whether or not there is an L2 hit for the cache block (reference numeral 158). Similarly, if the response is shared and the transaction is not RdExc, the L2 cache 36 or the memory controller 14 may supply the data dependent on whether or not there is an L2 hit for the cache block.

If the transaction is remote and uncacheable, then the memory bridge 32 may generate a noncoherent read command on the interfaces 30 to read the data. For example, a standard HT read command may be used (reference numeral 160). If the remote transaction is cacheable and the response on the interconnect 22 is exclusive, then the exclusive owner supplies the data for the read (reference numeral 162). If the remote transaction is cacheable, the response is not exclusive, the cache block is an L2 cache hit, and the transaction is either RdShd or the transaction is RdExc and the L2 cache has the block in the modified state, then the L2 cache 36 supplies the data for the read (reference numeral 164). Otherwise, the memory bridge 32 initiates a corresponding read command to the home node of the cache block (reference numeral 166).

Figure 16:
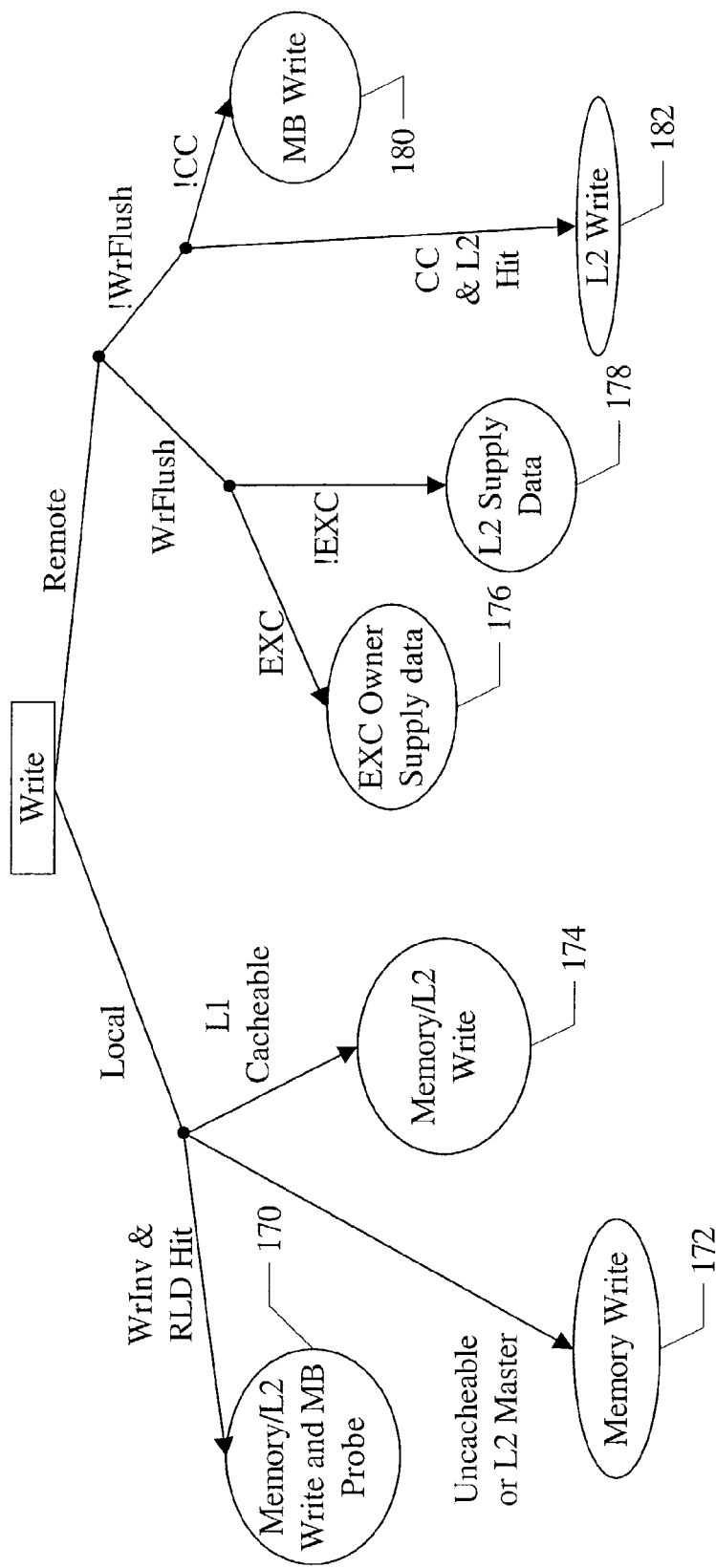
FIG. 16 is a decision tree illustrating operation of one embodiment of a node for a write transaction on the interconnect within the system.

Turning next to FIG. 16, a decision tree for a write transaction to a memory space address on the interconnect 22 of a system 10 is shown for one embodiment. The decision tree may illustrate operation of the node for the write transaction for different conditions of the transaction, the state of the cache block accessed by the transaction, etc. The write transaction may, in one embodiment, include the Wr, WrInv, and WrFlush transactions shown in the table 142 of FIG. 13. Each dot on the lines within the decision tree represents a divergence point of one or more limbs of the tree, which are labeled with the corresponding conditions. Where multiple limbs emerge from a dot, taking one limb also implies that the conditions for the other limbs are not met. In FIG. 16, the exclamation point ("!") is used to indicate a logical NOT. Not shown in FIG. 16 is the state transition made by each coherent agent which is caching a copy of the cache block for the write transaction. The coherent agent invalidates its copy of the cache block.

If the transaction is a local transaction, and the transaction is a WrInv transaction that hits in the remote line directory 34 (i.e. a remote node is caching a copy of the cache block), the memory controller 14 (and the L2 cache 36, if an L2 hit) updates with the write data (reference numeral 170). Additionally, the memory bridge 32 may generate probes to the remote nodes indicated by the remote line directory 34. The update of the memory/L2 cache may be delayed until the probes have been completed, at which time the memory bridge 32 may transmit the transaction identifier of the WrInv transaction to the L2 cache 36/memory controller 14 to permit the update.

If the local transaction is uncacheable or if the L2 cache 36 is the master of the transaction (that is, the L2 cache 36 initiated the transaction), then the memory controller 14 updates with the data (reference numeral 172). If the local transaction is cacheable, the memory controller 14 and/or the L2 cache 36 updates with the data based on whether or not there is an L2 cache hit (and, in some embodiments, based on an L2 cache allocation indication in the transaction, which allows the source of the transaction to indicate whether or not the L2 cache allocates a cache line for an L2 cache miss) (reference numeral 174A).

If the transaction is a remote transaction, the transaction is a WrFlush transaction, and the response to the transaction is exclusive, the exclusive owner supplies the data (reference numeral 176). If the remote WrFlush transaction results in a non-exclusive response (shared or invalid), the L2 cache 36 supplies the data of the WrFlush transaction (reference numeral 178). In one embodiment, the L2 cache 36 retains the state of the node as recorded in the home node, and the L2 cache 36 uses the WrFlush transaction to evict a remote cache block which is in the modified state in the node. Thus, if another agent has the cache block in the exclusive state, that agent may have a more recent copy of the cache block that should be returned to the home node. Otherwise, the L2 cache 36 supplies the block to be returned to the home node. In either case, the memory bridge 32 may capture the WrFlush transaction and data, and may perform a WB command to return the cache block to the home node.

If the remote transaction is not a WrFlush transaction, and is not cache coherent, the memory bridge 32 receives the write transaction and performs a non coherent write command (e.g. a standard HT write command) to transmit the cache block to the home node (reference numeral 180). If the remote transaction is not a WrFlush transaction, is cache coherent, and is an L2 hit, the L2 cache 36 may update with the data (reference numeral 182).

Figure 17:
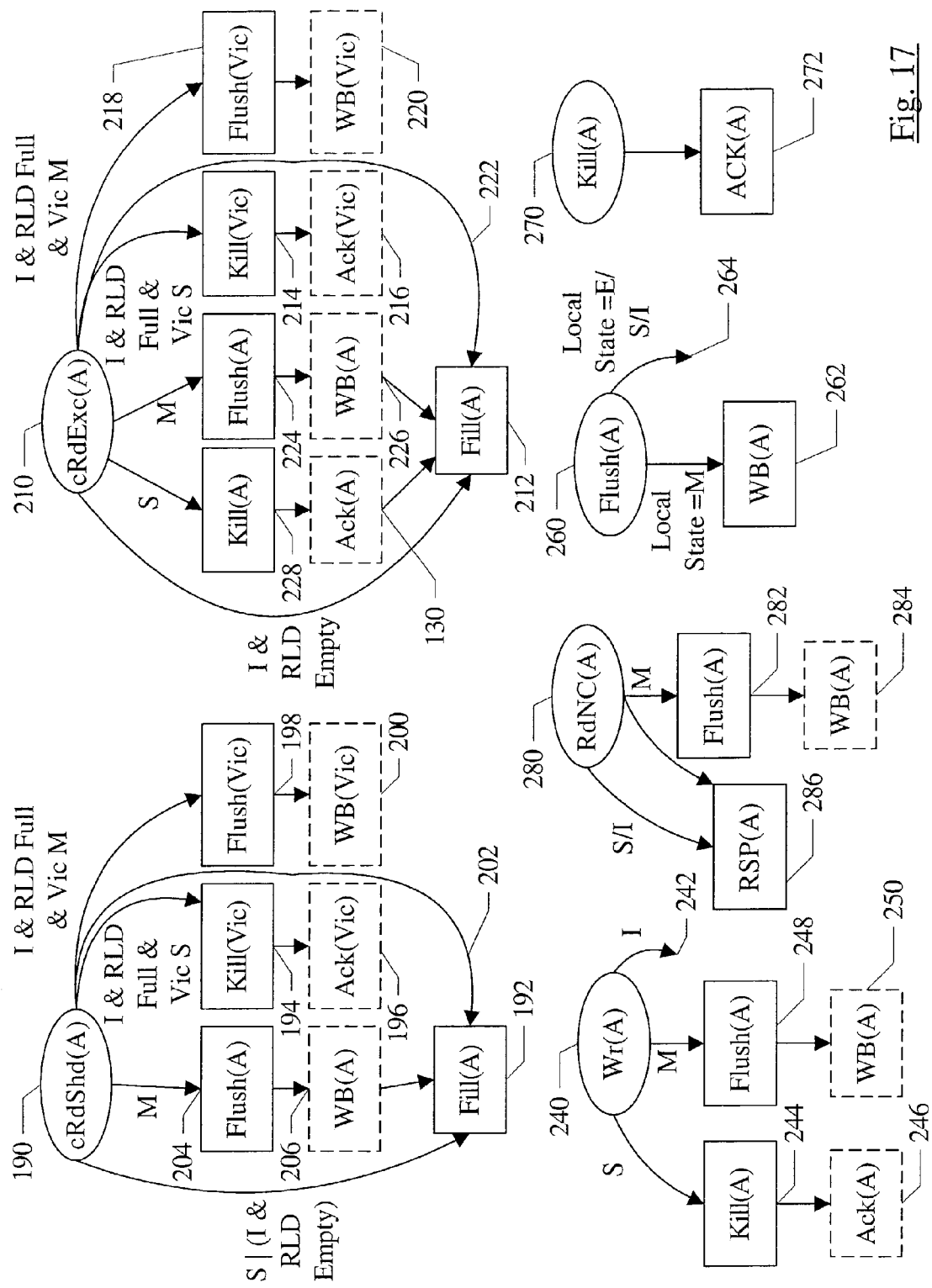
FIG. 17 is a diagram illustrating operation of one embodiment of the memory bridge shown in FIG. 1 for remote coherency commands received by the memory bridge.

Turning next to FIG. 17, a block diagram illustrating operation of one embodiment of the memory bridge 32 in response to various coherency commands received from the interface circuits 20A-20C is shown. The received command is shown in an oval. Commands initiated by the memory bridge 32 in response to the received command (and the state of the affected cache block as indicated in the remote line directory 34) are shown in solid boxes. Dotted boxes are commands received by the memory bridge 32 in response to the commands transmitted in the preceding solid boxes. The cache block affected by a command is shown in parentheses after the command.

In one embodiment, the remote line directory 34 may be accessed in response to a transaction on the interconnect 22. In such an embodiment, the memory bridge 32 may initiate a transaction on the interconnect 22 in response to certain coherent commands in order to retrieve the remote line directory 34 (as well as to affect any state changes in the coherent agents coupled to the interconnect 22, if applicable). In other embodiments, the memory bridge 32 may be configured to read the remote line directory 34 prior to generating a transaction on the interconnect 22, and may conditionally generate a transaction if needed based on the state of the remote line directory 34 for the requested cache block. Additionally, in one embodiment, the remote line directory 34 may maintain the remote state for a subset of the local cache blocks that are shareable remotely (e.g. a subset of the portion of the remote coherent space 148 that is assigned to the local node). If a cache block is requested by a remote node using a coherency command and there is no entry in the remote line directory 34 for the cache block, then a victim cache block may be replaced in the remote line directory 34 (and probes may be generated to invalidate the victim cache block in remote nodes). In other embodiments, the remote line directory 34 may be configured to track the state of each cache block in the portion of the remote coherent space 148 that is assigned to the local node. In such embodiments, operations related to the victim cache blocks may be omitted from FIG. 17.

For a cRdShd command for cache block "A" received by the memory bridge 32 (reference numeral 190), the memory bridge 32 may generate a RdShd transaction on the interconnect 22. Based on the remote line directory (RLD) state for the cache block A, a number of operations may occur. If the RLD state is shared, or invalid and there is an entry available for allocation without requiring a victim cache block to be evicted ("RLD empty" in FIG. 17), then the memory bridge 32 may transmit a fill command to the remote node with the data supplied to the memory bridge 32 in response to the RdShd transaction on the interconnect 22 (reference numeral 192). On the other hand, if the RLD state is invalid and an eviction of a victim block is used to free an RLD entry for cache block A, then the memory bridge 32 may transmit probes to the remote nodes having copies of the victim cache block. If the victim cache block is shared, the memory bridge 32 may transmit a Kill command (or commands, if multiple nodes are sharing the victim cache block) for the victim block (reference numeral 194). The remote nodes respond with Kill_Ack commands for the victim block (reference numeral 196). If the victim block is modified, the memory bridge 32 may transmit a Flush command to the remote node having the modified state (reference numeral 198). The remote node may return the modified block with a WB command (reference numeral 200). In either case of evicting a victim block, the memory bridge 32 may, in parallel, generate a Fill command for the cache block A (reference numeral 192, via arrow 202). Finally, if the RLD state is modified for the cache block A, the memory bridge 32 may generate a Flush command for the cache block A to the remote node (reference numeral 204), which responds with a WB command and the cache block A (reference numeral 206). The memory bridge 32 may then transmit the Fill command with the cache block A provided via the write back command (reference numeral 192).

In response to a cRdExc command for a cache block A (reference numeral 210), operation may be similar to the cRdShd case for some RLD states. Similar to the cRdShd case, the memory bridge 32 may initiate a RdExc transaction on the interconnect 22 in response to the cRdExc command. Similar to the cRdShd case, if the RLD is invalid and no eviction of a victim cache block is needed in the RLD to allocate an entry for the cache block A, then the memory bridge 32 may supply the cache block supplied on the interconnect 22 for the RdExc transaction in a fill command to the remote node (reference numeral 212). Additionally, if the RLD state is invalid for the cache block A and a victim cache block is evicted from the RLD 34, the memory bridge 32 may operate in a similar fashion to the cRdShd case (reference numerals 214 and 216 and arrow 222 for the shared case of the victim block and reference numerals 218 and 220 and arrow 222 for the modified case of the victim block). If the RLD state is modified for the cache block A, the memory bridge 32 may operate in a similar fashion to the cRdShd case (reference numerals 224 and 226). If the RLD state is shared for the cache block A, the memory bridge 32 may generate Kill commands for each remote sharing node (reference numeral 228). The memory bridge 32 may wait for the Kill_Ack commands from the remote sharing nodes (reference numeral 230), and then transmit the Fill command with the cache block A provided on the interconnect 22 in response to the RdExc transaction (reference numeral 212).

In response to a Wr command to the cache block A (reference numeral 240), the memory bridge 32 may generate a Wr transaction on the interconnect 22. If the RLD state is invalid for the cache block A, the memory bridge 32 may transmit the write data on the interconnect 22 and the Wr command is complete (reference numeral 242). If the RLD state is shared for the cache block A, the memory bridge 32 may generate Kill commands to each remote sharing node (reference numeral 244) and collect the Kill_Ack commands from those remote nodes (reference numeral 246) in addition to transmitting the data on the interconnect 22. If the RLD state is modified for a remote node, the memory bridge 32 may generate a Flush command to the remote node (reference numeral 248) and receive the WB command from the remote node (reference numeral 250). In one embodiment, the memory bridge 32 may delay transmitting the write data on the interconnect 22 until the WB command or Kill_Ack commands are received (although the data returned with the WB command may be dropped by the memory bridge 32).

The above commands are received by the memory bridge 32 for cache blocks for which the system 10 including the memory bridge 32 is the home node. The memory bridge 32 may also receive Flush commands or Kill commands for cache blocks for which the system 10 is a remote node. In response to a Flush command to the cache block A (reference numeral 260), the memory bridge 32 may initiate a RdKill or RdInv transaction on the interconnect 22. If the local state of the cache block is modified, the memory bridge 32 may transmit a WB command to the home node, with the cache block supplied on the interconnect 22 in response to the RdKill or RdInv transaction (reference numeral 262). If the local state of the cache block is not modified, the memory bridge 32 may not respond to the Flush command (reference numeral 264). In this case, the node may already have transmitted a WB command to the home node (e.g. in response to evicting the cache block locally). In response to a Kill command to the cache block A (reference numeral 270), the memory bridge 32 may initiate a RdKill or RdInv transaction on the interconnect 22. The memory bridge 32 may respond to the Kill command with a Kill_Ack command (reference numeral 272).

In one embodiment, the memory bridge 32 may also be configured to receive a non-cacheable read (RdNC) command (e.g. corresponding to a standard HT read) (reference numeral 280). In response, the memory bridge 32 may initiate a RdShd transaction on the interconnect 22. If the RLD state is modified for the cache block including the data to be read, the memory bridge 32 may transmit a Flush command to the remote node having the modified cache block (reference numeral 282), and may receive the WB command from the remote node (reference numeral 284). Additionally, the memory bridge 32 may supply data received on the interconnect 22 in response to the RdShd transaction as a read response (RSP) to the requesting node (reference numeral 286).

FIG. 18 is a table illustrating one embodiment of remote line directory 34 updates in response to transactions on the interconnect 22. The source column in FIG. 18 indicates whether the source is a local coherent agent (e.g. the processors 12A-12N) or a remote agent (via the memory bridge 32). The transaction column in FIG. 18 indicates the transaction (one of the transactions from the table 142). The RLD state column in FIG. 18 indicates the state output by the remote line directory 34 in response to the transaction. The possible states in this embodiment are M (Modified), S (Shared), or I (Invalid, or miss). The New RLD state column in FIG. 18 indicates the state to which the remote line directory 34 updates in response to the transaction. The Set Owner? column in FIG. 18 indicates whether or not the remote node that caused the transaction is indicated as an owner in the remote line directory 34 (where "—" means don't care). The Reset Other Owners? column indicates whether or not other owners that may be indicated in the remote line directory 34 are removed.

Numerous variations and modifications will become apparent to those skilled in the art once the above disclosure is fully appreciated. It is intended that the following claims be interpreted to embrace all such variations and modifications.

What is claimed is:

1. An apparatus comprising:
 a plurality of memories;
 a plurality of systems, each of the plurality of systems including at least one processor, a cache, interface circuits for receiving and sending data, a bridge and a memory controller, in which the memory controller is coupled to a respective one of the plurality of memories and each of the plurality of systems is coupled to at least one other one of the plurality of systems for bi-directional data transfer between the plurality of systems, wherein each of the plurality of systems further comprises one or more coherent agents configured to access the plurality of memories, and wherein the plurality of systems enforce coherency across the plurality of systems for at least some accesses, the plurality of systems including at least one system to bi-directionally receive and transmit packets to and from a network; and
 a switch interface circuit, wherein at least one system is coupled to the switch interface circuit separate from the interconnection of the plurality of systems, wherein the switch interface circuit is configured to interface the apparatus to a switch fabric, and wherein the switch interface circuit is coupled to bi-directionally receive and transmit packets between the at least one system coupled to the switch interface circuit and the switch fabric.

2. The apparatus as recited in claim 1 further comprising a port aggregator circuit coupled to the network through a plurality of ports to receive and transmit packets.

3. The apparatus as recited in claim 2 wherein the port aggregator circuit is configured to aggregate packets from the network ports.

4. The apparatus as recited in claim 1 further comprising a coprocessor coupled to one of the plurality of systems.

5. The apparatus as recited in claim 4 wherein the coprocessor is configured to assist in processing packets.

6. The apparatus as recited in claim 4 wherein the coprocessor is configured to perform a lookup function.

7. The apparatus as recited in claim 4 wherein the coprocessor is configured to perform security processing on a packet.

8. The apparatus as recited in claim 1 wherein each of the plurality of systems is integrated onto a separate integrated circuit.

9. The apparatus as recited in claim 1 wherein at least one system is coupled to an input/output (I/O) interface.

10. The apparatus as recited in claim 9 wherein the at least one system that is coupled to the I/O interface is to receive and transmit packets for data transfer with the I/O interface through the bridge.

11. The apparatus as recited in claim 9 wherein the at least one system that is coupled to the I/O interface is to receive and transmit packets for data transfer with the I/O interface through the bridge and the interface circuits.

12. The apparatus as recited in claim 1 wherein the at least one system to receive and transmit packets to and from the network is disposed on a first circuit card, and wherein at least one other one of the plurality of systems is attached to a second circuit card coupled to the first circuit card.

13. A network device comprising:
a switch fabric; and
one or more line cards coupled to the switch fabric, wherein each of the line cards is coupled to receive and transmit packets to a respective network, and wherein each of the line cards comprises:
a plurality of memories;
a plurality of systems, each of the plurality of systems including at least one processor, a cache, interface circuits for receiving and sending data, a bridge, and a memory controller, in which the memory controller is coupled to a respective one of the plurality of memories and each of the plurality of systems is coupled to at least one other one of the plurality of systems for bi-directional data transfer between the plurality of systems, wherein each of the plurality of systems further comprises one or more coherent agents configured to access the plurality of memories, and wherein the plurality of systems enforce coherency across the plurality of systems for at least some accesses, and wherein the plurality of systems are further configured to route packets between at least some of the plurality of systems, the plurality of systems including at least one system to bi-directionally receive and transmit packets to and from the respective network; and
a switch interface circuit, wherein at least one system is coupled to the switch interface circuit separate from the interconnection of the plurality of systems, wherein the switch interface circuit is configured to interface the apparatus to the switch fabric, and wherein the switch interface circuit is coupled to bi-directionally receive and transmit packets between the at least one system coupled to the switch interface circuit and the switch fabric.

14. The network device as recited in claim 13 wherein each of the plurality of line cards further comprises a port aggregator circuit coupled to the respective network through a plurality of ports to receive and transmit packets.

15. The network device as recited in claim 13 wherein each of the plurality of line cards further comprises a coprocessor coupled to one of the plurality of systems.

16. The network device as recited in claim 15 wherein one of the coprocessors is configured to assist in processing packets.

17. The network device as recited in claim 15 wherein one of the coprocessors is configured to perform a lookup function.

18. The network device as recited in claim 15 wherein one of the coprocessors is configured to perform security processing on a packet.

19. The network device as recited in claim 13 further including a network service card comprising:
a plurality of service card memories; and
a plurality of service card systems, each of the plurality of service card systems including a memory controller coupled to a respective one of the plurality of service card memories and each of the plurality of service card systems coupled to at least one other one of the plurality of service card systems, wherein each of the plurality of service card systems further includes one or more coherent agents configured to access the plurality of service card memories, and wherein the plurality of service card systems enforce coherency across the plurality of service card systems for at least some accesses.

* * * * *